(12) United States Patent
Hayashida et al.

(10) Patent No.: US 11,156,940 B2
(45) Date of Patent: Oct. 26, 2021

(54) IMAGE FORMING APPARATUS WITH A MECHANISM FOR SUPPLYING TONER FOR FORMING AN IMAGE, AND METHOD THEREOF

(71) Applicant: CANON KABUSHIKI KAISHA, Tokyo (JP)

(72) Inventors: Kei Hayashida, Tokyo (JP); Kenji Matsuzaka, Kanagawa (JP); Tomio Noguchi, Shizuoka (JP); Takahiro Azeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/075,524

(22) Filed: Oct. 20, 2020

(65) Prior Publication Data

US 2021/0124284 A1 Apr. 29, 2021

(30) Foreign Application Priority Data

Oct. 25, 2019 (JP) .............................. JP2019-194553

(51) Int. Cl.
*G03G 15/00* (2006.01)
*G03G 15/08* (2006.01)
(Continued)

(52) U.S. Cl.
CPC ..... *G03G 15/0867* (2013.01); *G03G 15/0887* (2013.01); *G03G 15/80* (2013.01); *G03G 21/1657* (2013.01); *G06F 3/1238* (2013.01)

(58) Field of Classification Search
CPC ........... G03G 15/0867; G03G 15/0887; G03G 15/5016; G03G 15/5091; G03G 15/80;
(Continued)

(56) References Cited

U.S. PATENT DOCUMENTS

| 10,228,646 B1* | 3/2019 | Kenmotsu .......... G03G 15/5016 |
| 2016/0057296 A1* | 2/2016 | Tamura .............. G03G 15/5091 |
| | | 358/1.13 |

(Continued)

FOREIGN PATENT DOCUMENTS

JP H0830084 A 2/1996

*Primary Examiner* — Sophia S Chen
(74) *Attorney, Agent, or Firm* — Canon U.S.A., Inc. I.P. Division

(57) ABSTRACT

An image forming apparatus includes a main body that includes a photosensitive member on which an electrostatic latent image is formed and a development unit configured to develop the photosensitive member with toner. The main body is configured to discharge a recording material on which an image is formed with the toner onto a discharge tray. The image forming apparatus also includes a toner supply port on which a supply container is mounted to supply toner to a toner containing portion of the development unit. The image forming apparatus further includes a non-contact communication portion including an antenna and configured to receive a signal for user authentication. The discharge tray, the toner supply port, and the non-contact communication portion are provided at an upper portion of the main body. The non-contact communication portion is provided outside the discharge tray when the main body is viewed from above.

14 Claims, 27 Drawing Sheets

(51) Int. Cl.
*G06F 3/12* (2006.01)
*G03G 21/16* (2006.01)

(58) Field of Classification Search
CPC ............... G03G 21/16; G03G 21/1604; G03G 2221/16; G03G 15/0877; G03G 15/6552; G03G 21/1657; G06F 3/1238
See application file for complete search history.

(56) References Cited

U.S. PATENT DOCUMENTS

| | | | |
|---|---|---|---|
| 2018/0260670 A1* | 9/2018 | Marunouchi | G03G 15/5091 |
| 2020/0012775 A1* | 1/2020 | Yoshino | G03G 15/5016 |
| 2021/0080863 A1* | 3/2021 | Hong | G03G 15/0867 |
| 2021/0103242 A1* | 4/2021 | Umeda | G03G 15/5016 |

* cited by examiner

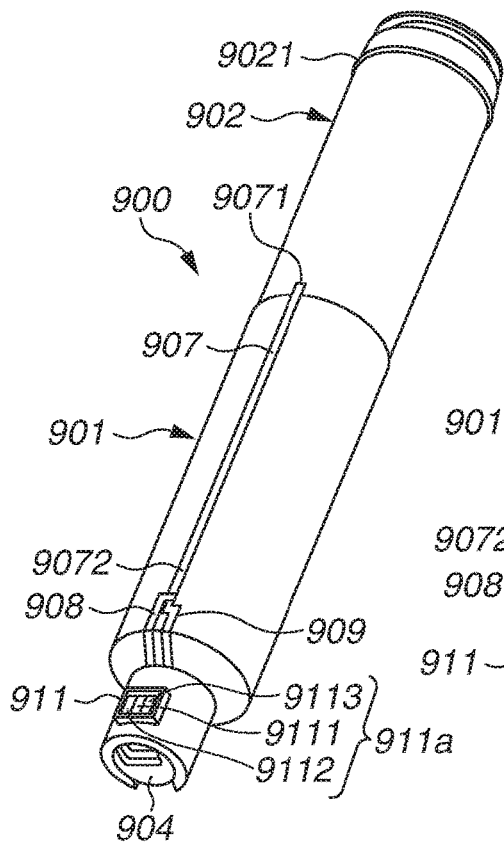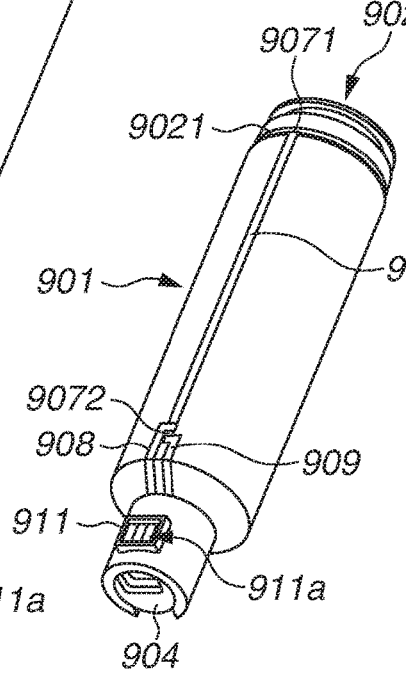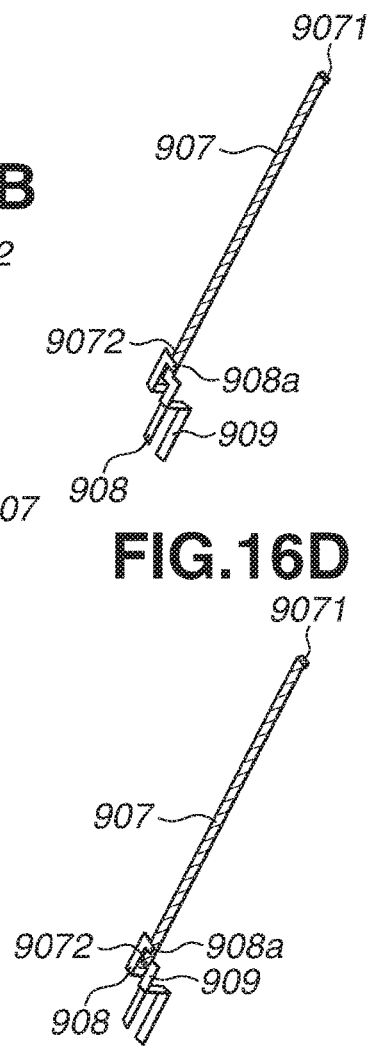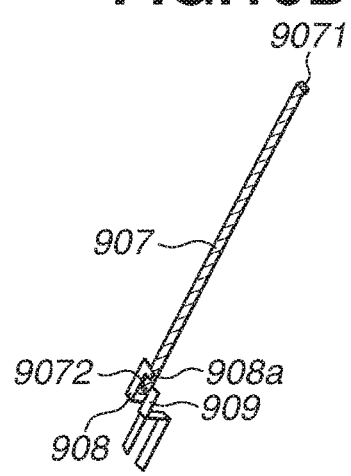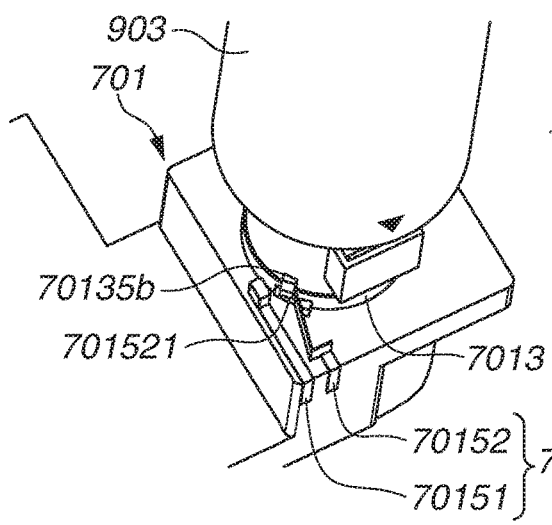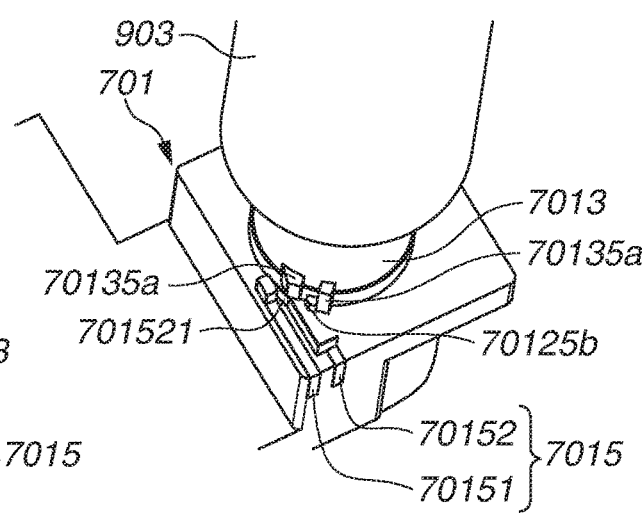

IMAGE FORMING APPARATUS WITH A MECHANISM FOR SUPPLYING TONER FOR FORMING AN IMAGE, AND METHOD THEREOF

BACKGROUND

Field

The present disclosure relates to an image forming apparatus including a process cartridge.

Description of the Related Art

In general, an electrophotographic image forming apparatus develops, using toner, an electrostatic latent image formed on the surface of a photosensitive member into a toner image, and then transfers the toner image onto a recording material from the surface of the photosensitive member, thereby forming an image on the recording medium. As methods for supplying an image forming apparatus with toner to be consumed by repeatedly performing an image forming operation, a process cartridge method and a sequential supply method are known. The process cartridge method is a method in which a photosensitive member and a developer container that contains toner are integrally formed as a process cartridge, and when a toner remaining amount in the developer container is zero or close to zero, the process cartridge is replaced with a new process cartridge.

On the other hand, an image forming apparatus that uses the sequential supply method is also known (Japanese Patent Application Laid-Open No. H08-30084). The development apparatus includes a toner conveyance path for supplying toner to a development roller, and a developer supply box connected to the toner conveyance path. In the development apparatus, toner is supplied from the developer supply box to the toner conveyance path depending on a result of detection of a toner remaining amount.

In recent year, user demand has risen for using an image forming apparatus in various ways, using various methods other than the process cartridge method and sequential supply method described above.

SUMMARY

According to various embodiments of the present disclosure, an image forming apparatus includes a main body that includes a photosensitive member on which an electrostatic latent image is formed and a development unit configured to develop the photosensitive member with toner and is configured to discharge a recording material on which an image is formed with the toner onto a discharge tray. The image forming apparatus also includes toner supply port on which a supply container is mounted to supply toner to a toner containing portion of the development unit. The image forming apparatus also includes a non-contact communication portion including an antenna and configured to receive a signal for user authentication. The discharge tray, the toner supply port, and the non-contact communication portion are provided at an upper portion of the main body. The non-contact communication portion is provided outside the discharge tray when the main body is viewed from above.

Further features of the present disclosure will become apparent from the following description of exemplary embodiments with reference to the attached drawings.

BRIEF DESCRIPTION OF THE DRAWINGS

FIGS. 16A and 16B are perspective views each illustrating the toner bottle unit according to the first modified example, in which the illustration of an outer cylinder is omitted.

FIGS. 16C and 16D are diagrams each illustrating components related to push-in detection of the toner bottle unit, and FIGS. 16E and 16F are diagrams each illustrating components related to rotation detection of the toner bottle unit.

DESCRIPTION OF THE EMBODIMENTS

Exemplary embodiments of the present disclosure will be described below with reference to the drawings.

First Exemplary Embodiment (1) Image Forming Apparatus

Figure 1A:
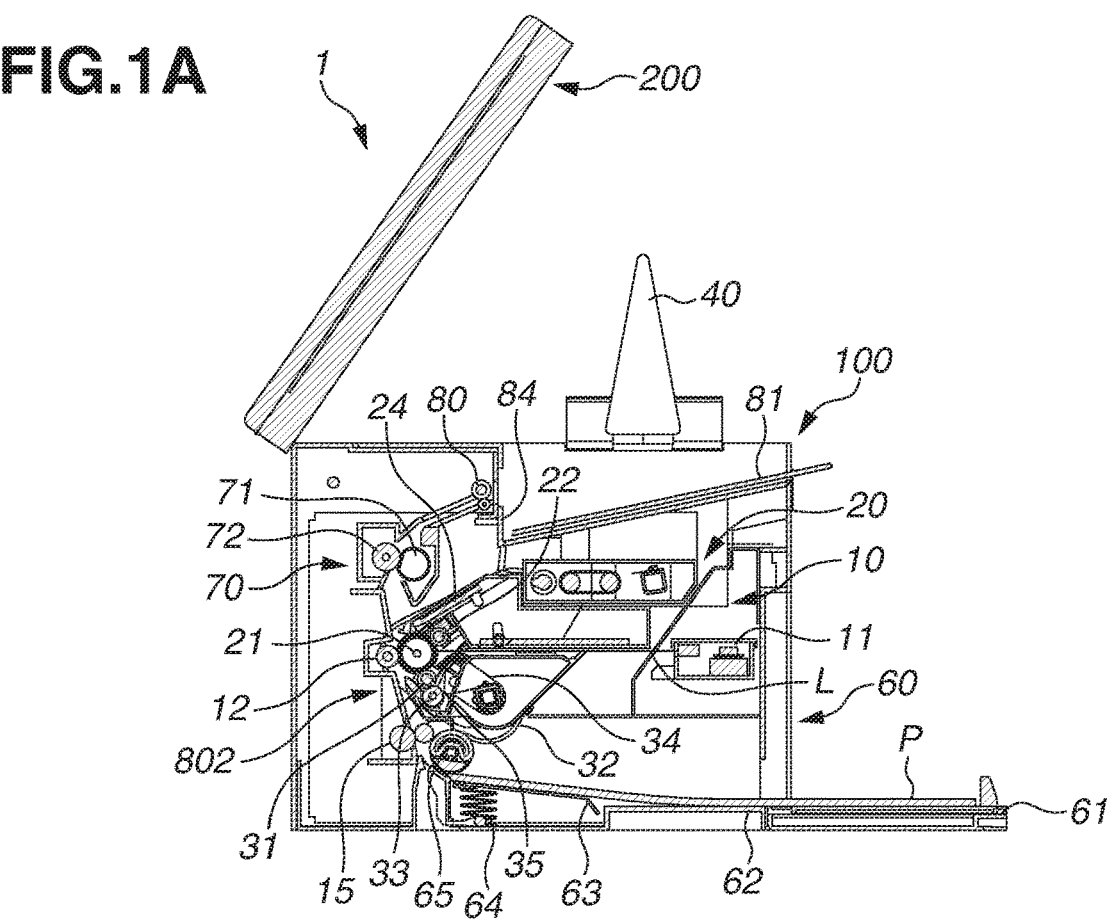
FIG. 1A is a sectional view of an image forming apparatus according to a first exemplary embodiment.

FIG. 1A is a schematic view illustrating a configuration of an image forming apparatus 1 according to a first exemplary embodiment. The image forming apparatus 1 is a black-and-white printer that forms an image on a recording material based on image information received from an external apparatus. Examples of the recording material include various sheet materials made of different materials, including paper, such as plain paper and thick paper, a plastic film, such as an overhead projector sheet, a sheet with a special shape, such as an envelope and index paper, and cloth.

(1-1) Overall Configuration

Figure 1B:
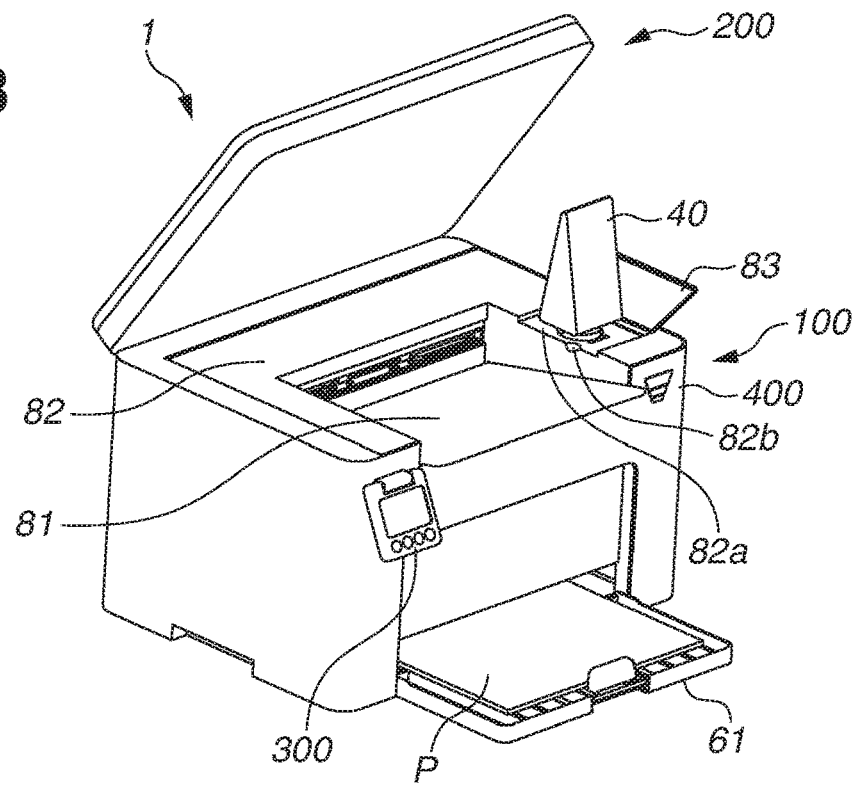
FIG. 1B is a perspective view of the image forming apparatus according to the first exemplary embodiment.

As illustrated in FIGS. 1A and 1B, the image forming apparatus 1 includes a printer body 100 as a main body, a reader 200 that is openably/closably supported by the printer body 100, and an operation portion 300 that is mounted on an outer package surface of the printer body 100. The printer body 100 includes an image forming portion 10, a sheet feed portion 60, a fixing portion 70, and a discharge roller pair 80. The sheet feed portion 60 feeds a recording material to the image forming portion 10, and the image forming portion 10 forms a toner image on the recording material. The fixing portion 70 fixes the toner image formed by the image forming portion 10 onto the recording material, and the discharge roller pair 80 discharges the recording material, which has passed through the fixing portion 70, to the outside of the image forming apparatus 1. A process cartridge 20 according to the present exemplary embodiment employs a direct supply method for directly supplying toner from the outside of the image forming apparatus 1 by using a toner pack 40 that is filled with toner for supply.

The image forming portion 10 is an electrophotographic image forming unit including a scanner unit 11, a process cartridge 20, and a transfer roller 12. The process cartridge 20 includes a photosensitive drum 21, a charging roller 22, a development roller 31, and a cleaning blade 24. The charging roller 22, the development roller 31, and the cleaning blade 24 are disposed near the photosensitive drum 21.

The photosensitive drum 21 serving as an image carrying member according to the present exemplary embodiment is a photosensitive member that is formed in a cylindrical shape. The photosensitive drum 21 according to the present exemplary embodiment includes a photosensitive layer formed of an organic photosensitive member having negative charging properties on a drum-like base formed of aluminum. The photosensitive drum 21 is rotationally driven at a predetermined process speed in a predetermined direction (clockwise direction in the drawings) by a motor.

The charging roller 22 contacts the photosensitive drum 21 with a predetermined pressing force, thereby forming a charging portion. A desired charging voltage is applied by a charging high-voltage power source so that the surface of the photosensitive drum 21 is uniformly charged to a predetermined potential. In the present exemplary embodiment, the photosensitive drum 21 is charged to a negative polarity by the charging roller 22.

The scanner unit 11 irradiates the photosensitive drum 21 with a laser beam L corresponding to image information input from the external apparatus or the reader 200 by using a polygon mirror, thereby performing scanning exposure on the surface of the photosensitive drum 21. This exposure enables an electrostatic latent image corresponding to the image information to be formed on the surface of the photosensitive drum 21. The scanner unit 11 is not limited to a laser scanner apparatus. For example, a light-emitting diode (LED) exposure apparatus including an LED array in which a plurality of LEDs is arranged along a longitudinal direction of the photosensitive drum 21 may be employed.

A development unit 802 includes the development roller 31 which serves as a developer carrying member that carries developer, a developer container 32 which serves as a frame of the development unit 802, and a supply roller 33 capable of supplying developer to the development roller 31. The development roller 31 and the supply roller 33 are rotatably supported by the developer container 32. The development roller 31 is disposed in an opening of the developer container 32 in such a manner that the development roller 31 faces the photosensitive drum 21. The supply roller 33 is rotatably in contact with the development roller 31, and toner contained as developer in the developer container 32 is applied to coat the surface of the development roller 31 by the supply roller 33.

The development unit 802 according to the first exemplary embodiment uses a contact development method as a development method. Specifically, a toner layer carried on the development roller 31 serving as a development unit contacts the photosensitive drum 21 in a development portion (development area) where the photosensitive drum 21 and the development roller 31 face each other. A development voltage is applied to the development roller 31 by a development high-voltage power source. Under the development voltage, the toner carried on the development roller 31 is transferred onto the surface of the photosensitive drum 21 from the development roller 31 according to a potential distribution on the surface of the photosensitive drum 21, thereby developing the electrostatic latent image into the toner image. In the present exemplary embodiment, a reversal development method is employed. Specifically, the toner image is formed such that toner adheres to an area where the amount of charges is decreased due to the exposure in an exposure step on the surface of the photosensitive drum 21 that has been charged in a charging step.

The present exemplary embodiment uses toner which has a particle size of 6 μm and has a negative polarity as a normal charging polarity. For example, polymerized toner generated by a polymerization method is used as toner according to the present exemplary embodiment. Toner used in the present exemplary embodiment is nonmagnetic one-component developer which does not contain any magnetic components and which is carried on the development roller 31 mainly by an intermolecular force or electrostatic force (image force). Alternatively, one-component developer containing magnetic components may be used. The one-component developer may contain not only toner particles but also additives (e.g., wax or silica particles) for adjusting the fluidity or charging performance of toner. As developer, two-component developer containing nonmagnetic toner and magnetic carrier may be used. In the case of using magnetic developer, for example, a cylindrical development sleeve in which a magnet is disposed is used as the developer carrying member. In other words, the developer container 32 may contain not only one-component developer composed of toner components but also two-component developer composed of toner and carrier.

An agitation member 34 serving as an agitation unit is provided in the developer container 32. The agitation member 34 is driven and rotated to agitate toner contained in the developer container 32, and delivers toner to the development roller 31 and the supply roller 33. Further, the agitation member 34 functions to circulate, in the developer container 32, toner that is not used for development and removed from the surface of the development roller 31 to maintain the uniform toner concentration in the developer container 32.

A development blade 35 that regulates the amount of toner to be carried on the development roller 31 is disposed in the opening of the developer container 32 at which the development roller 31 is disposed. Toner supplied onto the surface of the development roller 31 passes through a portion opposed to the development blade 35 along with the rotation of the development roller 31, so that a thin toner layer is formed with a uniform thickness on the development roller 31. Then, the toner layer is charged to the negative polarity by triboelectric charging.

The sheet feed portion 60 includes a front door 61 that is openably/closably supported by the printer body 100, a stacking tray 62, an intermediate plate 63, a tray spring 64, and a pickup roller 65. The stacking tray 62 constitutes a bottom surface in a recording material containing space that appears when the front door 61 is opened. The intermediate plate 63 is liftably supported by the stacking tray 62. The tray spring 64 biases the intermediate plate 63 upward, thereby pressing a recording material P stacked on the intermediate plate 63 against the pickup roller 65. The front door 61 closes the recording material containing space in a state where the front door 61 is closed with respect to the printer body 100, and the front door 61 supports the recording material P with the stacking tray 62 and the intermediate plate 63 in a state where the front door 61 is opened with respect to the printer body 100.

The transfer roller 12 serving as a transfer unit transfers the toner image formed on the surface of the photosensitive drum 21 of the process cartridge 20 onto the recording material P. The present exemplary embodiment is described using a direct transfer method, as an example, in which a toner image formed on the surface of the image carrying member is directly transferred onto a recording material from the image carrying member. However, it is also possible to employ an intermediate transfer method in which a toner image is transferred onto a recording material through an intermediate transfer member, such as an intermediate transfer belt, from the image carrying member. In this case, for example, a transfer unit including an intermediate transfer belt, a primary transfer roller that primarily transfers the toner image onto the surface of the intermediate transfer belt from the photosensitive drum, and a secondary transfer roller that transfers the toner image onto a recording material from the intermediate transfer belt functions as the transfer unit according to the present exemplary embodiment.

The fixing portion 70 employs a heat fixing method for performing an image fixing process by heating and melting toner on a recording material. The fixing portion 70 includes a fixing film 71, a fixing heater, such as a ceramic heater, which heats the fixing film 71, a thermistor that measures the temperature of the fixing heater, and a pressure roller 72 that is brought into pressure contact with the fixing film 71.

Next, an image forming operation to be performed by the image forming apparatus 1 will be described. When an image forming command is input to the image forming apparatus 1, an image forming process to be performed by the image forming portion 10 is started based on image information input from the reader 200 or an external computer connected to the image forming apparatus 1. The scanner unit 11 applies the laser beam L to the photosensitive drum 21 based on the input image information. At this time, the photosensitive drum 21 is preliminarily charged by the charging roller 22, so that an electrostatic latent image is formed on the surface of the photosensitive drum 21 when the photosensitive drum 21 is irradiated with the laser beam L. After that, the electrostatic latent image is developed into a toner image by the development roller 31 and the toner image is formed on the surface of the photosensitive drum 21.

In parallel with the image forming process described above, the pickup roller 65 of the sheet feed portion 60 delivers the recording material P supported by the front door 61, the stacking tray 62, and the intermediate plate 63. The recording material P is fed to a registration roller pair 15 by the pickup roller 65, and comes into contact with a nip formed between the registration roller pair 15, thereby correcting a skew. Further, the registration roller pair 15 is driven in accordance with a toner image transfer timing obtained from an exposure start time of the scanner unit 11, and conveys the recording material P to a transfer portion which corresponds to a nip portion formed by the transfer roller 12 and the photosensitive drum 21.

A transfer voltage is applied to the transfer roller 12 from a transfer high-voltage power source, and the toner image carried on the photosensitive drum 21 is transferred onto the recording material P conveyed by the registration roller pair 15. Transfer residual toner on the surface of the photosensitive drum 21 which has undergone the transfer process is removed by the cleaning blade 24 serving as an elastic blade that contacts the photosensitive drum 21. The recording material P onto which the toner image is transferred is conveyed to the fixing portion 70, and the toner image is heated and pressurized when the toner image passes through the nip portion between the fixing film 71 and the pressure roller 72 of the fixing portion 70. As a result, toner particles are melted and then fixed, so that the toner image is fixed onto the recording material P. The recording material P which has passed through the fixing portion 70 is discharged to the outside of the image forming apparatus 1 by the discharge roller pair 80, and is then stacked on a discharge tray 81 that is formed in an upper portion of the printer body 100.

The discharge tray 81 is inclined upward toward a downstream side in a recording material discharge direction. The recording materials P discharged onto the discharge tray 81 slide down on the discharge tray 81 toward a regulating surface 84, so that trailing edges of the recording materials P are aligned by the regulating surface 84.

(1-2) Openable/Closable Portion of Image Forming Apparatus

Figure 2A:
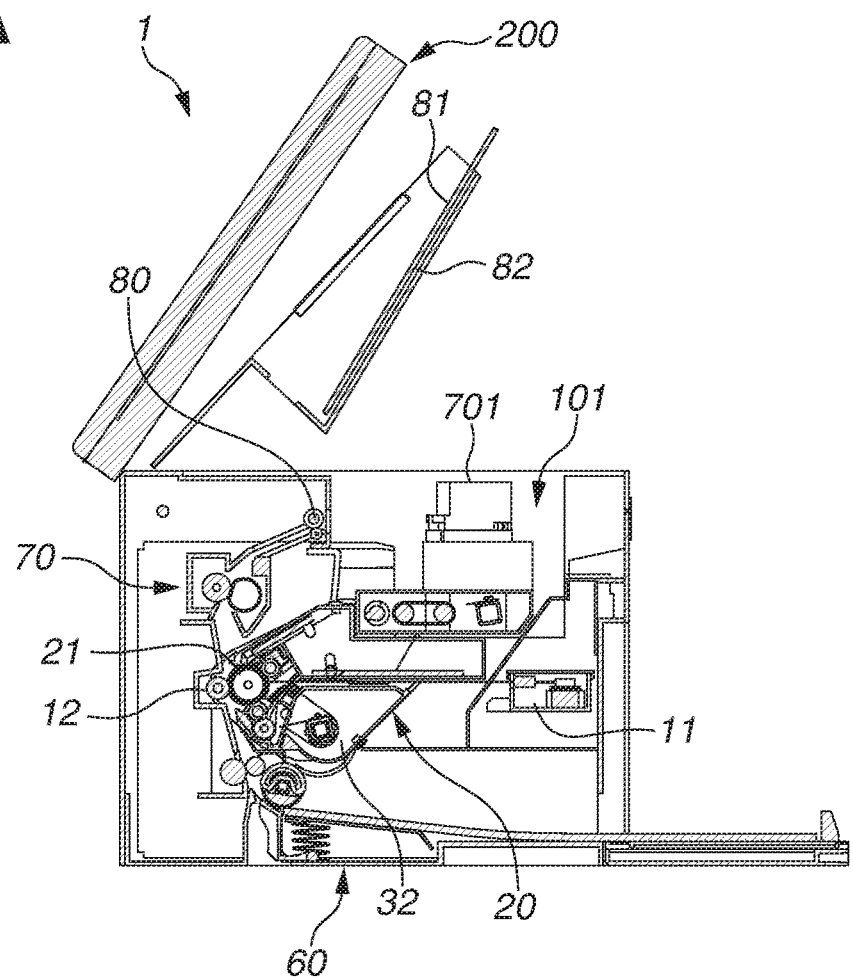
FIG. 2A is a sectional view of the image forming apparatus according to the first exemplary embodiment.
Figure 2B:
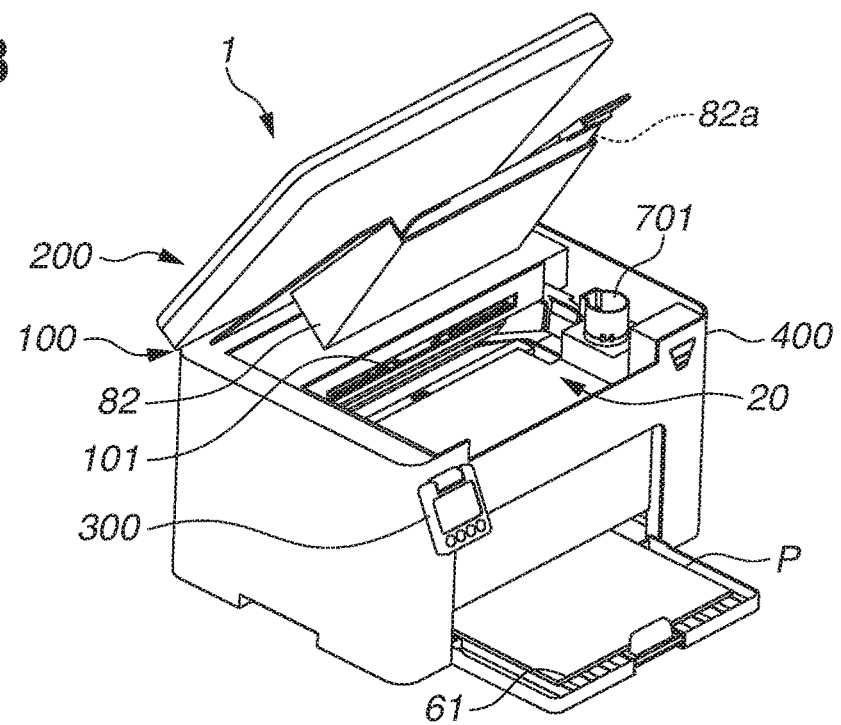
FIG. 2B is a perspective view of the image forming apparatus according to the first exemplary embodiment.
Figure 3:
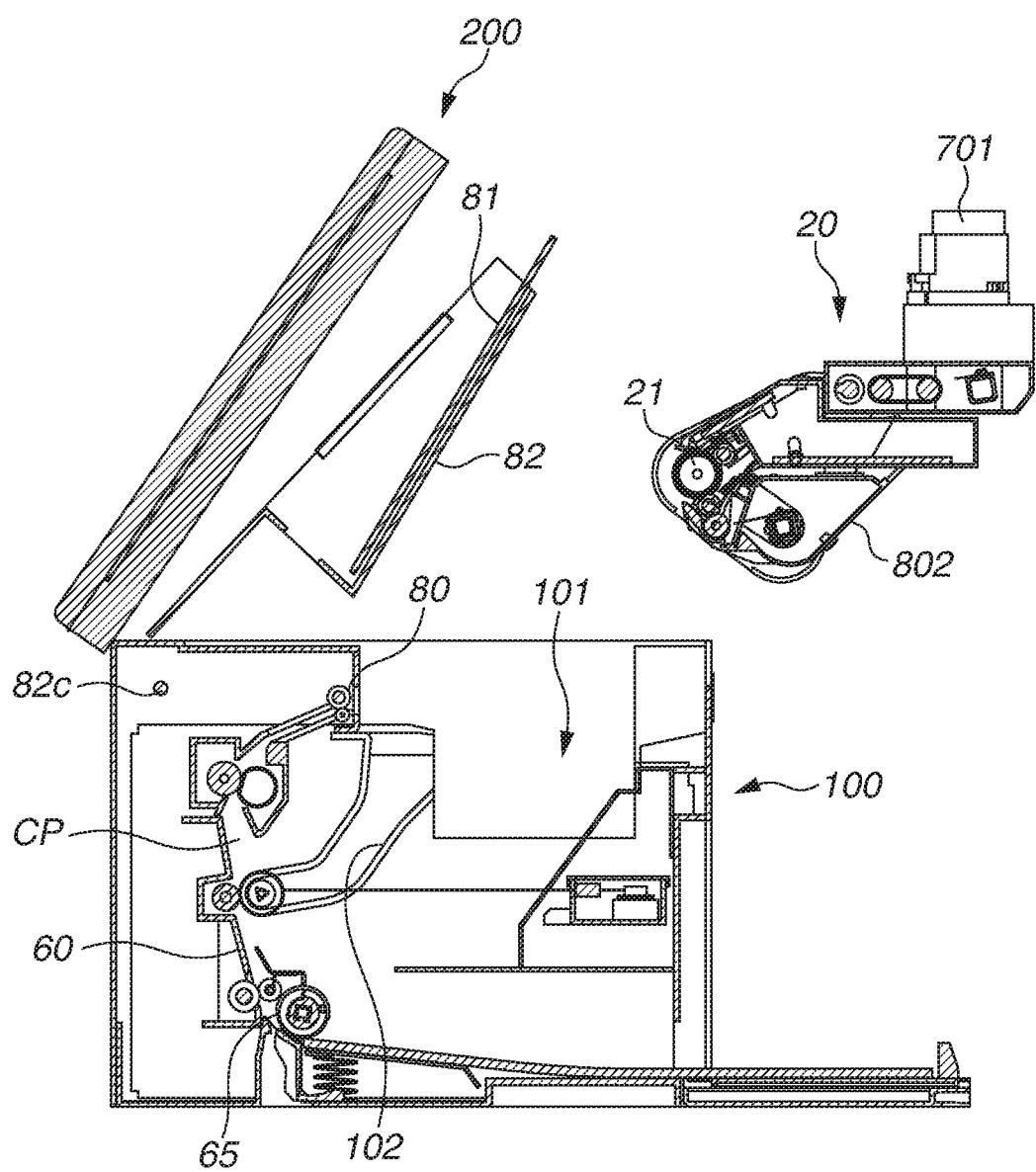
FIG. 3 illustrates mounting/dismounting of a process cartridge according to the first exemplary embodiment.

As illustrated in FIGS. 2A, 2B, and 3, a first opening 101 that is opened upward is provided in an upper portion of the printer body 100. The first opening 101 is covered with a top cover 82 in a use state (see FIG. 1B), and the process cartridge 20 is exposed to the outside when the top cover 82 is opened upward (see FIG. 2B). The top cover 82 is supported to be openable and closable with respect to the printer body 100 about a pivot axis 82c (see FIG. 3) which extends in a right-left direction, and an upper surface of the top cover 82 is provided with the discharge tray 81. The top cover 82 is opened toward a back side from a front side in a state where the reader 200 is opened with respect to the printer body 100. The reader 200 and the top cover 82 may be configured to be held in an open state or a closed state by a holding mechanism such as a hinge mechanism.

For example, if a recording material is jammed (sheet jam occurs) in a conveyance path CP through which the recording material fed by the pickup roller 65 passes, a user opens the top cover 82 together with the reader 200. Then, the user accesses the process cartridge 20 from the first opening 101, which is exposed to the outside when the top cover 82 is opened, and the user pulls out the process cartridge 20 along a cartridge guide 102. The cartridge guide 102 guides the process cartridge 20 while sliding along a protruding portion 21a (see FIG. 5A), which is provided at an end of the process cartridge 20 in an axial direction of the photosensitive drum 21.

When the process cartridge 20 is pulled out to the outside from the first opening 101, a space through which a user's hand can reach the conveyance path CP is formed. The user puts his/her hand into the printer body 100 from the first opening 101 to access the recording material jammed in the conveyance path CP, thereby making it possible to remove the jammed recording material.

Figure 4A:
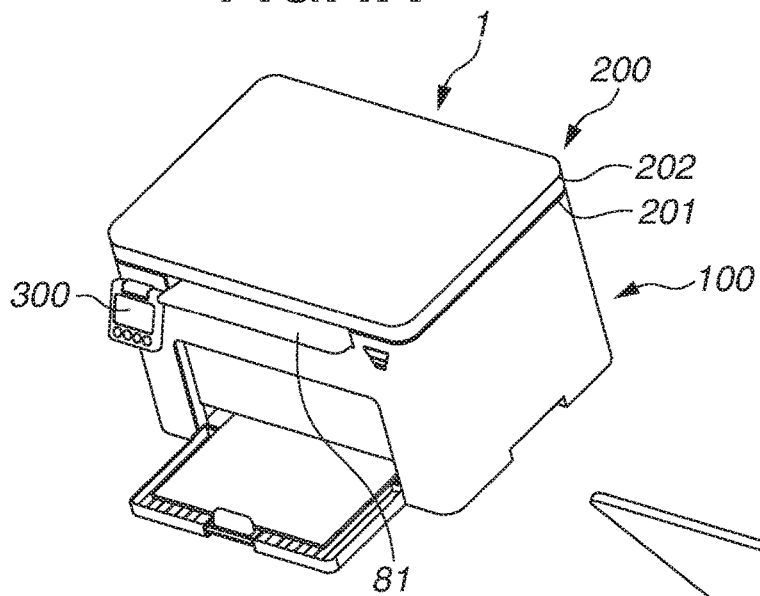
FIGS. 4A, 4B, and 4C each illustrate an openable/closable member of the image forming apparatus according to the first exemplary embodiment.
Figure 4B:
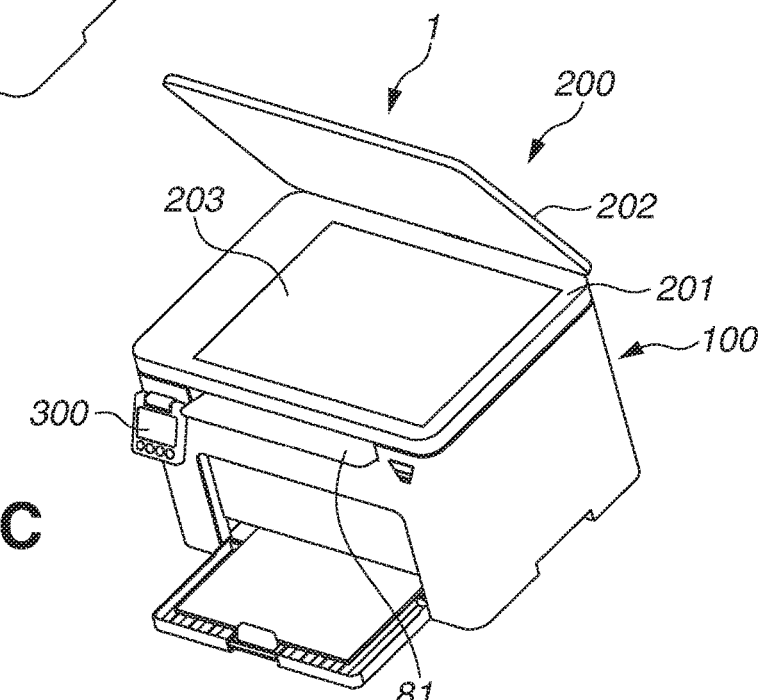
Figure 4C:
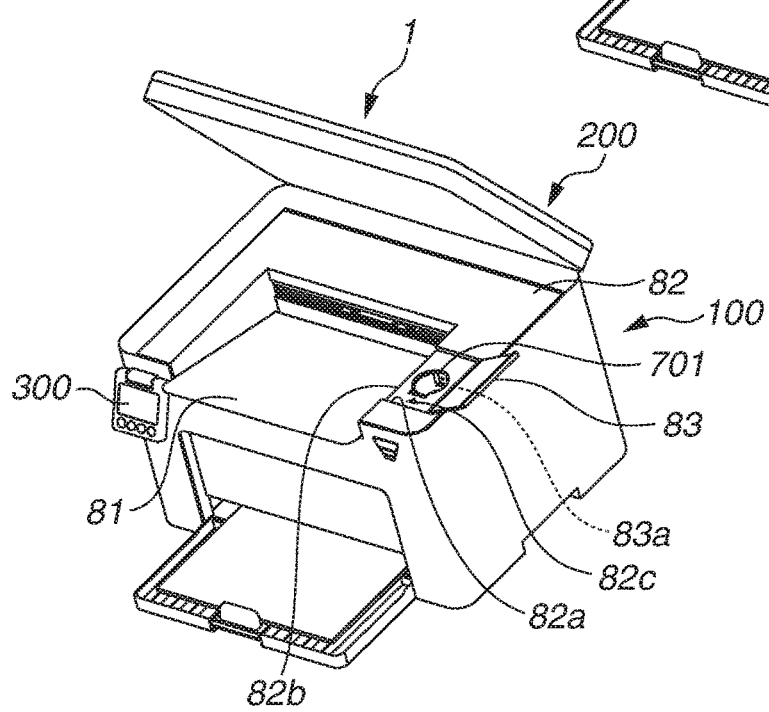

In the first exemplary embodiment, as illustrated in FIGS. 1B and 4C, an opening/closing member 83 is openably/closably provided on the top cover 82. The upper surface of the top cover 82 on which the discharge tray 81 is provided is provided with an opening 82a that is opened upward. When the opening/closing member 83 is closed, the opening 82a is covered. The opening/closing member 83 and the opening 82a are provided on the right side of the top cover 82. The opening/closing member 83 is supported by the top cover 82 to be openable and closable about a pivot axis 83a extending in a front-back direction. The user can flip open the opening/closing member 83 by putting his/her finger in a groove portion 82b provided on the top cover 82. The opening/closing member 83 is formed in a substantially L-shape along the shape of the top cover 82. The opening/closing member 83 is not limited to the above-described opening/closing mechanism. For example, the opening/closing member 83 may be disposed on the top cover 82 so as to cover a supply container mounting portion 701, and may be configured to open or close the opening 82a by pivoting so as to slide along the upper surface of the top cover 82 about the pivot axis vertically crossing the top cover 82. In this case, sliding along the upper surface of the top cover 82 indicates that the movement of the opening/closing member 83 in the pivot axis direction is regulated.

The opening 82a is formed so that the supply container mounting portion 701 for toner supply provided in the upper portion of the process cartridge 20 is exposed to the outside. By opening the opening/closing member 83, the user can access the supply container mounting portion 701 without opening the top cover 82. By mounting the toner pack 40 on the supply container mounting portion 701, the user can supply toner to the process cartridge 20.

The present exemplary embodiment employs the method (direct supply method) in which the user supplies toner to the process cartridge 20 from the toner pack 40 (see FIGS. 1A and 1B), which is filled with toner for supply, in a state where the process cartridge 20 is mounted on the image forming apparatus 1. Accordingly, even when only a small amount of toner remains in the process cartridge 20, there is no need for the user to perform a replacement work for taking out the process cartridge 20 from the printer body 100 to replace the process cartridge 20 with a new process cartridge. This leads to an improvement in usability. The image forming apparatus 1 and the toner pack 40 constitute an image forming system.

In the present exemplary embodiment, the reader 200 is provided at an upper portion of the image forming apparatus 1. Accordingly, in the case of opening the opening/closing member 83, the top cover 82 need to be exposed to the outside by opening the reader 200 first. However, the reader 200 may be omitted and the opening/closing member 83 may be configured to be exposed to the upper portion of the image forming apparatus 1.

(1-3) Reader

As illustrated in FIGS. 4A and 4B, the reader 200 includes a reading unit 201 incorporating a reading portion (not illustrated), and a pressing plate 202 that is openably/closably supported by the reading unit 201. An upper surface of the reading unit 201 is provided with a platen glass 203 through which light emitted from the reading portion is transmitted and on which a document is placed.

To cause the reader 200 to read an image on the document, the user places the document on the platen glass 203 in a state where the pressing plate 202 is opened. A positional deviation of the document on the platen glass 203 is prevented by closing the pressing plate 202. For example, the operation portion 300 is operated to output a reading command to the image forming apparatus 1. When a reading operation is started, the reading portion in the reading unit 201 reciprocates in a sub-scanning direction, i.e., in the right-left direction in a state where the operation portion 300 is located at the front of the image forming apparatus 1. While light is emitted from a light-emitting portion to the document, and light reflected by the document is received by a light-receiving portion, the reading portion photoelectrically converts the received light to thereby read the image on the document.

The front-back direction, right-left direction, and up-down direction (direction of gravitational force) of the image forming apparatus 1 will be defined below based on a state where the operation portion 300 is located at the front of the image forming apparatus 1. Positional relationships among the members, including the process cartridge 20, which are detachably mounted on the printer body 100, will be described based on a state where the printer body 100 is mounted. The term "longitudinal direction" of the process cartridge 20 indicates the axial direction of the photosensitive drum 21.

(1-4) Configuration of Process Cartridge

Figure 5A:
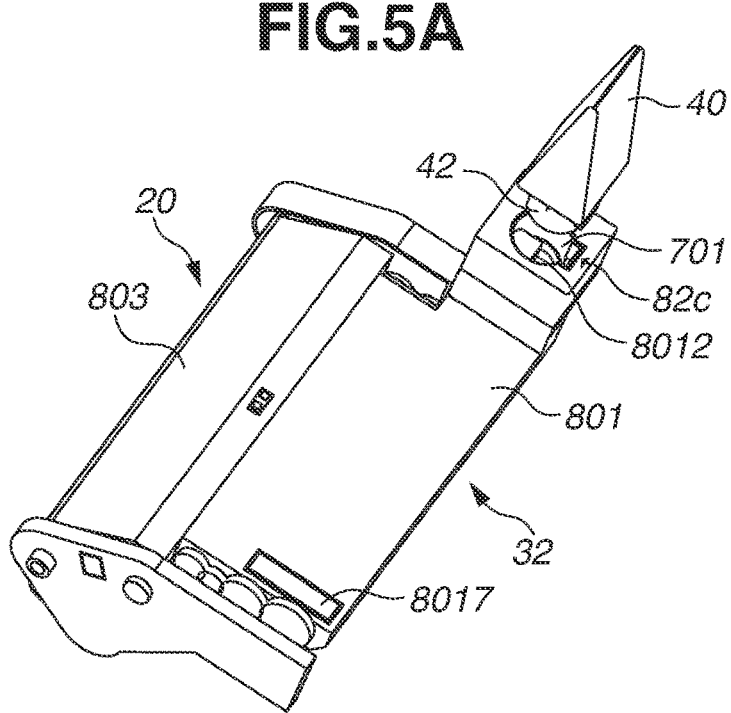
FIG. 5A is a perspective view illustrating a process cartridge and a toner pack according to the first exemplary embodiment.
Figure 5B:
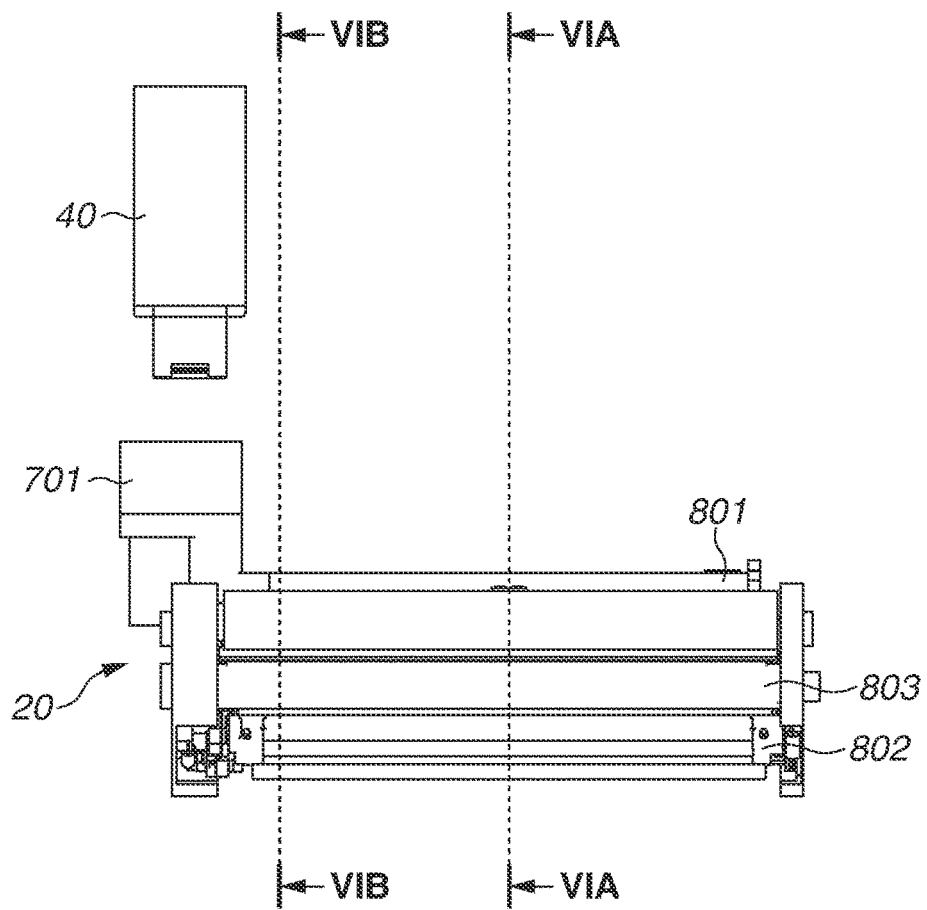
FIG. 5B is a side view illustrating the process cartridge and the toner pack according to the first exemplary embodiment.
Figure 6A:
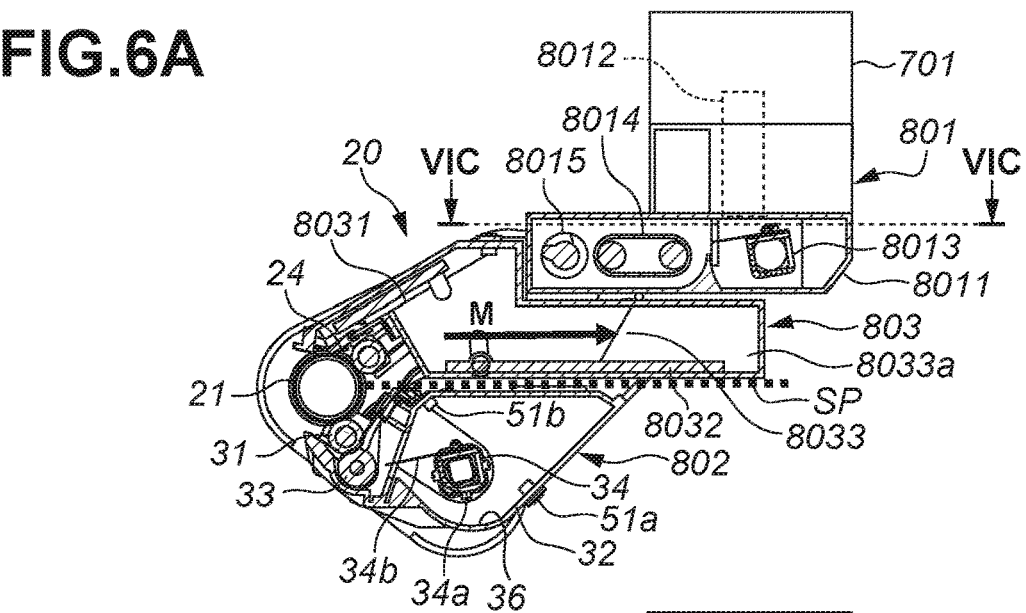
FIG. 6A is a sectional view of the process cartridge taken along a line VIA-VIA in FIG. 5B.
Figure 6B:
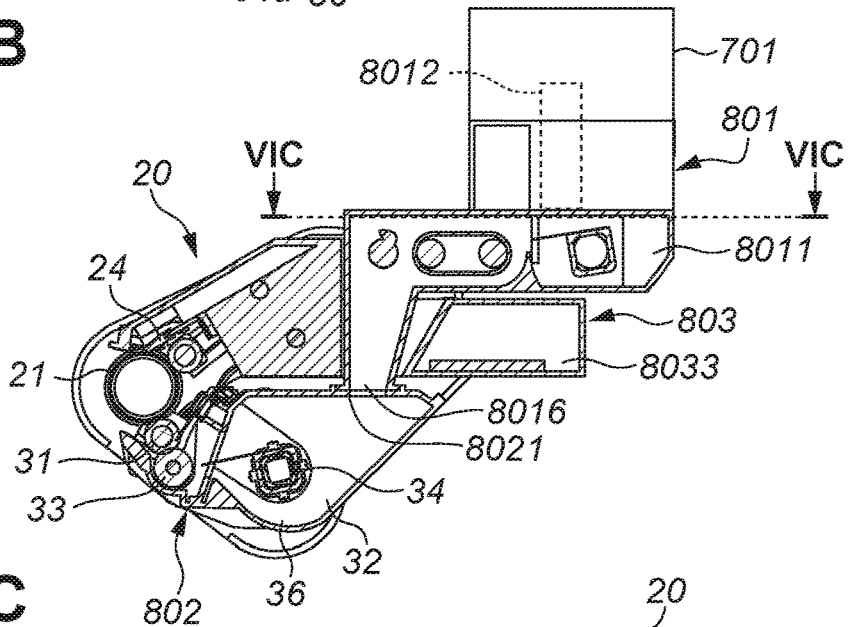
FIG. 6B is a sectional view of the process cartridge taken along a line VIB-VIB in FIG. 5B.
Figure 6C:
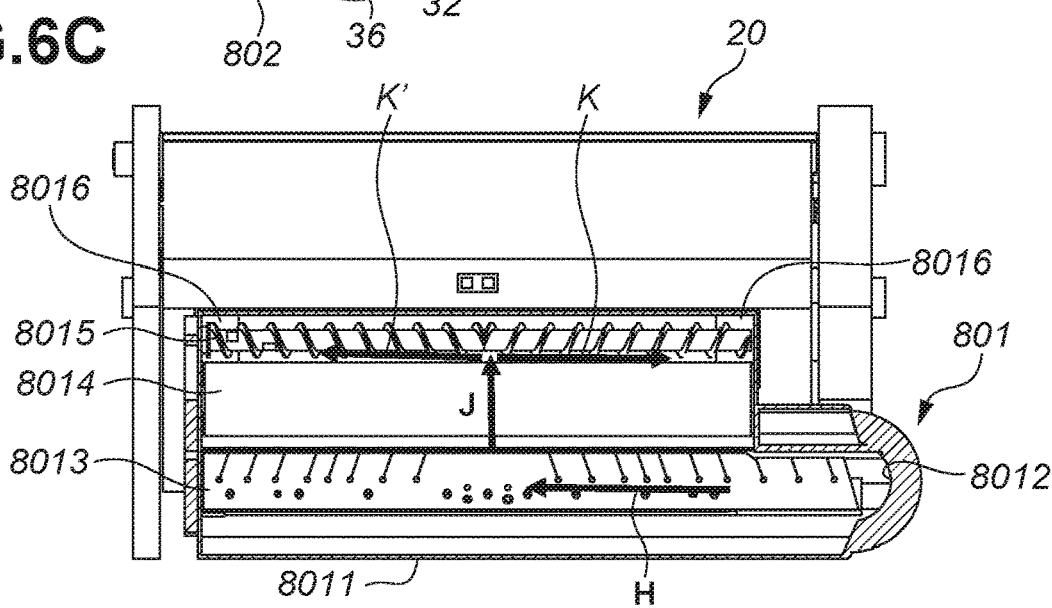
FIG. 6C is a sectional view of the process cartridge taken along a line VIC-VIC in FIGS. 6A and 6B.

Next, the configuration of the process cartridge 20 will be described. FIG. 5A is a perspective view illustrating the process cartridge 20 and the toner pack 40. FIG. 5B is a side view illustrating the process cartridge 20 and the toner pack 40. FIG. 6A is a sectional view of the process cartridge 20 taken along a line VIA-VIA in FIG. 5B. FIG. 6B is a sectional view of the process cartridge 20 taken along a line VIB-VIB in FIG. 5B. FIG. 6C is a sectional view of the process cartridge 20 taken along a line VIC-VIC in FIGS. 6A and 6B. FIGS. 5A to 6C each illustrate the outline of the supply container mounting portion 701 in a simplified manner (the detailed shape of the supply container mounting portion 701 is illustrated in, for example, FIG. 9A).

A toner supply operation using the toner pack 40 according to the first exemplary embodiment will be described with reference to FIGS. 5A, 5B, 6A, 6B, and 6C. As illustrated in FIGS. 5A to 6C, the process cartridge 20 includes a toner receiving unit 801, the development unit 802, and a cleaning unit 803. The toner receiving unit 801, the cleaning unit 803, and the development unit 802 are disposed in this order from top to bottom in the direction of gravitational force. These units will be described in order below.

The toner receiving unit 801 is disposed at an upper portion of the process cartridge 20. A toner containing portion 8011, which is formed of a frame in which toner is contained, is provided in the toner receiving unit 801. The supply container mounting portion 701 that is coupled with the toner pack 40 is provided at an end of the toner receiving unit 801 in the longitudinal direction. The frame constituting the toner containing portion 8011 may be composed of one member, or may be composed of a combination of a plurality of members. The supply container mounting portion 701 includes a supply port 8012 that receives toner discharged from the toner pack 40. The detailed configuration of the supply container mounting portion 701 and mounting of the toner pack 40 on the supply container mounting portion 701 will be described below.

In addition, a first conveyance member 8013, a second conveyance member 8014, and a third conveyance member 8015 are provided in the toner receiving unit 801. The first conveyance member 8013 conveys toner, which has fallen through the supply port 8012 onto an end of the toner containing portion 8011 in the longitudinal direction, in a direction indicated by an arrow H (see FIG. 6C) toward a central portion of the toner containing portion 8011. The second conveyance member 8014 conveys the toner conveyed by the first conveyance member 8013 to an upper portion of the development unit 802, i.e., to discharge ports 8016, in a direction indicated by an arrow J (see FIG. 6C) vertical to the longitudinal direction. The third conveyance member 8015 receives the toner from the second conveyance member 8014 mainly at the central portion in the longitudinal direction, and conveys the toner to one side and the other side in the longitudinal direction (in a direction indicated by an arrow K and in a direction indicated by an arrow K'). The first conveyance member 8013, the second conveyance member 8014, and the third conveyance member 8015, which are operated to move toner, are also referred to as first to third developer moving members, respectively.

When the toner supplied from the toner pack 40, which serves as a supply container, flows into the toner receiving unit 801, air also flows into the supply container. The toner receiving unit 801 includes an air filter 8017 (see FIG. 5A) for allowing the air to flow in the direction indicated by the arrow H during the toner supply operation so that the toner can be easily supplied during the toner supply operation. The air filter 8017 prevents a phenomenon in which part of the air flows in the direction opposite to the direction indicated by the arrow H due to an increase in the internal pressure of the toner receiving unit 801 during the toner supply operation and the toner is ejected from the supply port 8012.

At both ends of the toner receiving unit 801 in the longitudinal direction, the discharge ports 8016 (see FIG. 6B) for discharging toner from the toner containing portion 8011 to the developer container 32 of the development unit 802 are provided. The toner which has reached the discharge ports 8016 by the third conveyance member 8015 falls into the developer container 32 with the force of gravity. The discharge ports 8016 may also be provided with a conveyance member in the middle of the path to hold the toner movement with gravity.

The development unit 802 located in the lower portion of the process cartridge 20 includes openings 8021 (see FIG. 6B) that receive toner discharged from the discharge ports 8016. Sealing members (not illustrated) are provided between the discharge ports 8016 and the openings 8021, and gaps between the discharge ports 8016 and the openings 8021 are sealed to prevent the toner from leaking out from the gap.

Toner which has fallen into the toner receiving unit 801 from the toner pack 40 through supply port 8012 is conveyed by the first conveyance member 8013, the second conveyance member 8014, and the third conveyance member 8015 in the toner receiving unit 801. Then, the toner is delivered from the toner receiving unit 801 to the development unit 802 through the discharge ports 8016 and the openings 8021 which are provided at the both ends in the longitudinal direction. In such a manner, the toner supplied through the supply port 8012, which is located at the end of the process cartridge 20 in the longitudinal direction and is located at a position away from the developer container 32 in the horizontal direction as viewed from the longitudinal direction, is conveyed in the process cartridge 20 and then reaches the developer container 32.

In this manner, the toner containing portion 8011 of the toner receiving unit 801 and the developer container 32 of the development unit 802 communicate with each other, thereby constituting a container that forms a space for containing toner in the process cartridge 20. Accordingly, in the present exemplary embodiment, the supply port 8012 for supplying toner from the outside of the image forming apparatus 1 is provided as a part of the container of the process cartridge 20. However, the supply port 8012 to be directly coupled with the supply container may be provided on the printer body 100 and the process cartridge 20 may receive toner through the supply port 8012. In this case, the process cartridge 20 excluding the supply port 8012 can be attached to or detached from the image forming apparatus 1 as illustrated in FIG. 3.

The toner supplied to the development unit 802 through the openings 8021 is stored in a conveyance chamber 36 (see FIGS. 6A and 6B) that is formed in the developer container 32 formed of the frame of the development unit 802. The frame constituting the developer container 32 may be composed of one member, or may be composed of a combination of a plurality of members. Here, the conveyance chamber 36 is provided with the agitation member 34. The agitation member 34 includes a shaft member 34a that is provided near a rotation center of the agitation member 34, and a blade portion 34b that extends in a radial direction from the shaft member 34a. In a section, toner present in a rotation locus at a leading end of the blade portion 34b is pressed and moved along with the movement of the blade portion 34b. The toner supplied through the openings 8021 is conveyed toward the development roller 31, the supply roller 33, and the development blade 35, while the toner is agitated by the agitation member 34.

The cleaning unit 803 includes a fourth conveyance member 8031, a fifth conveyance member 8032, and a waste toner chamber 8033 which is formed of a frame (see FIGS. 6A and 6B). The frame constituting the waste toner chamber 8033 may be composed of one member, or may be composed of a combination of a plurality of members. The waste toner chamber 8033 is a space for containing a collected material, such as transfer residual toner (i.e., waste toner), which is collected from the surface of the photosensitive drum 21 by the cleaning blade 24. The waste toner chamber 8033 is provided independently of the internal space of each of the toner receiving unit 801 and the development unit 802. The waste toner collected by the cleaning blade 24 is conveyed in a direction indicated by an arrow M by the fourth conveyance member 8031 and the fifth conveyance member 8032, and is gradually deposited from a back portion 8033a of the waste toner chamber 8033 toward the front side.

Here, a laser passage space SP (see FIG. 6A) is formed between the cleaning unit 803 and the development unit 802 as a void through which the laser beam L emitted from the scanner unit 11 (see FIG. 1A) to the photosensitive drum 21 can pass. As described above, the discharge ports 8016 and the openings 8021 for delivering toner from the toner receiving unit 801 to the development unit 802 are provided at the both ends of each unit in the longitudinal direction. Accordingly, toner to be supplied from the outside of the image forming apparatus 1 (in particular, through the supply port 8012 formed in the upper surface of the apparatus) can be conveyed to the developer container 32, which is located in the lower portion of the process cartridge 20, while the laser passage space SP is ensured in a compact configuration of the process cartridge 20 as a whole.

(1-5) Configuration of Toner Pack

Figure 7A:
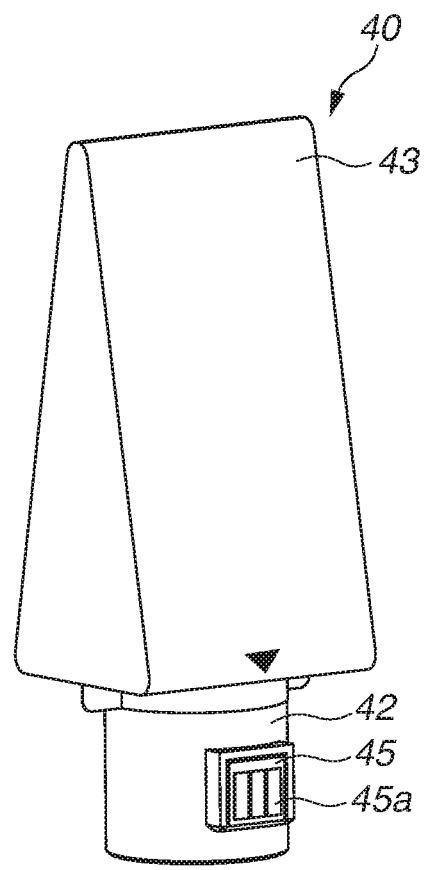
FIG. 7A is a perspective view of the toner pack according to the first exemplary embodiment.
Figure 7B:
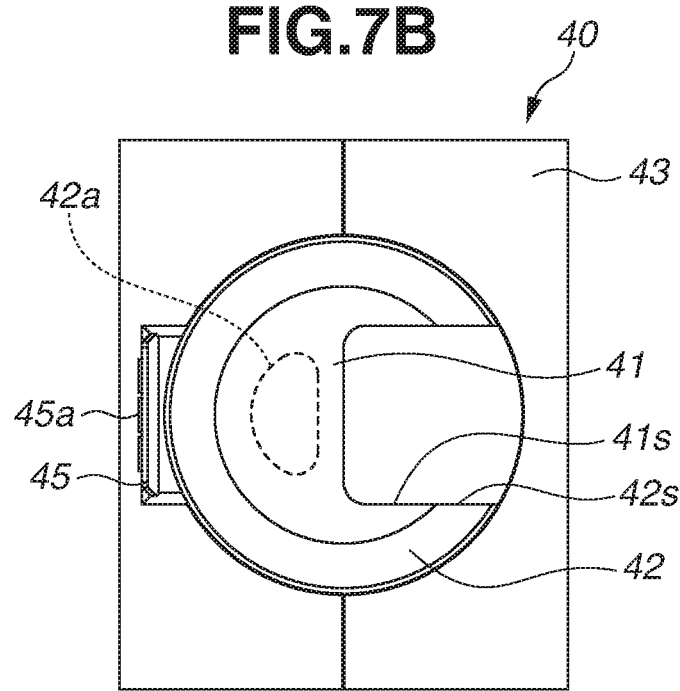
FIG. 7B is a bottom view of the toner pack according to the first exemplary embodiment.
Figure 8A:
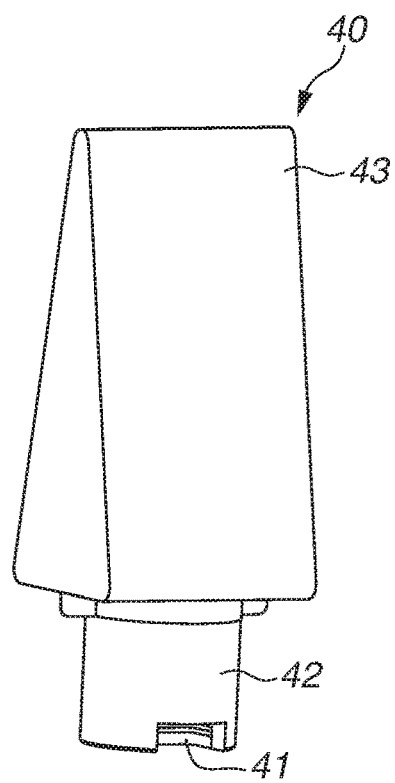
FIG. 8A is a perspective view of the toner pack according to the first exemplary embodiment.
Figure 8B:
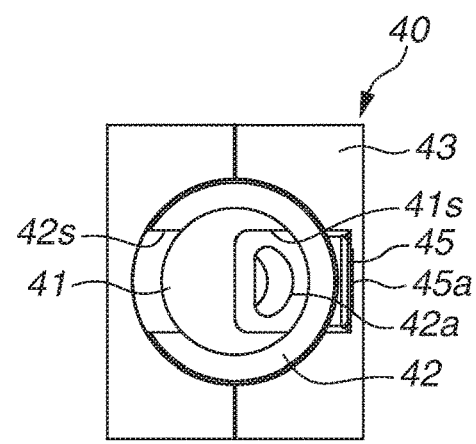
FIG. 8B is a bottom view of the toner pack according to the first exemplary embodiment.
Figure 8C:
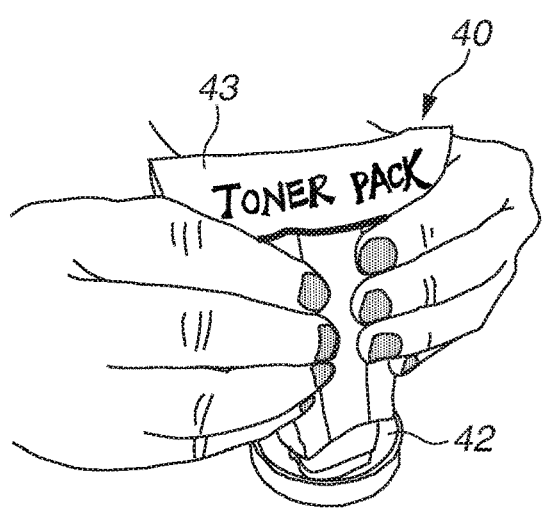
FIG. 8C is a view illustrating a state where toner is discharged from the toner pack by a user's hand.
Figure 12:
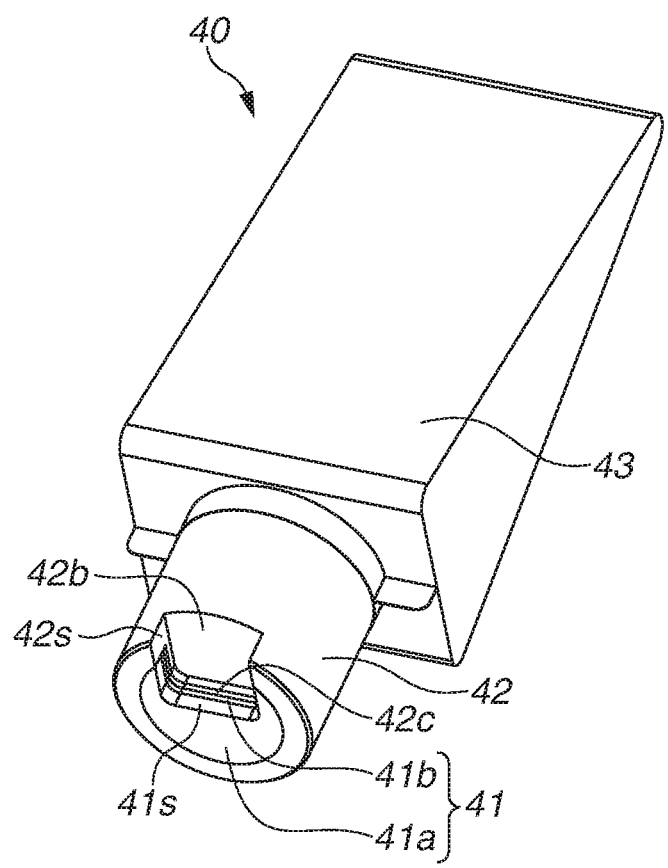
FIG. 12 is a perspective view of the toner pack according to the first exemplary embodiment.

The configuration of the toner pack 40 will be described. FIG. 7A is a perspective view of the toner pack 40 when a shutter member 41 is in a closed state. FIG. 7B is a bottom view of the toner pack 40 when the shutter member 41 is in the closed state. FIG. 8A is a perspective view of the toner pack 40 when the shutter member 41 is in an open state. FIG. 8B is a bottom view of the toner pack 40 when the shutter member 41 is in the open state. FIG. 8C illustrates a state where the user squeezes the toner pack 40 with his/her hands during the toner supply operation. FIG. 12 is a perspective view of the toner pack 40 when the shutter member 41 is in the closed state as viewed from below.

As illustrated in FIGS. 7A, 7B, 8A, 8B, and 8C, the toner pack 40, which is an example of the supply container, includes a bag member 43 filled with toner, a resin discharge portion 42 attached to the bag member 43, and the shutter member 41 capable of opening and closing the opening of the discharge portion 42. The discharge portion 42 is provided with a memory unit 45 as a storage unit that stores information about the toner pack 40. The memory unit 45 includes a plurality of metallic plates (metal terminals) exposed to the outside of the toner pack 40 as contact portions 45a that are brought into contact with contact portions 70133 (see FIG. 9B) of the supply container mounting portion 701 to be described below. As a material for the bag member 43, for example, polypropylene resin (PP resin), polyethylene terephthalate resin (PET resin), cardboard, or paper can be used. The bag member 43 may have a thickness in a range from 0.01 mm to 1.2 mm. The thickness of the bag member 43 is desired to be in a range from 0.05 mm to 1.0 mm in terms of easy handling of the bag by the user and sturdiness of the bag.

As illustrated in FIGS. 7B, 8B, and 12, the shutter member 41 has such a shape that a part of a disk that is rotatable relatively to the discharge portion 42 is cut out. A side surface of the cutout portion that forms the thickness of the shutter member 41 functions as an engagement surface 41s. The discharge portion 42 also has a shape with a cutout portion. The discharge portion 42 includes an engagement surface 42s, which is parallel to the engagement surface 41s, in the cutout portion. A discharge port 42a is provided at a position away from the engagement surface 42s by about 180 degrees in a circumferential direction of the discharge port 42a. Details of the engagement surface 41s and the engagement surface 42s are illustrated in FIG. 12.

As illustrated in FIGS. 7B and 12, when the positions of cutout portions of the shutter member 41 and the discharge portion 42 are aligned with each other as viewed from above or below, the discharge port 42a is covered with the shutter member 41 (closed state). As illustrated in FIG. 8B, when the shutter member 41 is rotated by 180 degrees with respect to the discharge portion 42, the discharge port 42a is exposed to the outside through the cutout portion of the shutter member 41, so that the internal space of the bag member 43 communicates with an external space of the toner pack 40. As illustrated in FIG. 12, the shutter member 41 is desirable to have a structure in which a sealing layer 41b formed of an elastic material, such as sponge, is bonded to a main body portion 41a having rigidity. In this case, the sealing layer 41b is brought into close contact with a sealing layer 42c, which covers a circumferential portion of the discharge port 42a, in the closed state, thereby preventing leakage of toner. The sealing layer 42c illustrated in FIG. 12 is also formed of an elastic material, such as sponge, like the sealing layer 41b.

As described below, to supply toner to the image forming apparatus 1 from the toner pack 40, the discharge portion 42 is aligned in a predetermined position to insert and connect the toner pack 40 to the supply container mounting portion 701. Then, the discharge portion 42 is rotated by 180 degrees to thereby allow the discharge portion 42 to be rotated relatively to the shutter member 41, and thus the discharge port 42a is opened. As a result, toner contained in the bag member 43 flows down into the toner receiving unit 801 with gravity. In this case, the shutter member 41 does not move relatively to the supply container mounting portion 701.

As illustrated in FIG. 8C, the user squeezes the bag member 43 with his/her hands in a state where the toner pack 40 is mounted on the supply container mounting portion 701 and is rotated by 180 degrees, thereby prompting discharge of toner from the toner pack 40.

While the first exemplary embodiment illustrates the rotary shutter member 41 as an example, the shutter member 41 may be omitted and a sliding shutter member may be applied instead of the rotary shutter member 41. Further, the shutter member 41 may be configured to be destroyed when the toner pack 40 is mounted on the supply port 8012, or when the toner pack 40 is rotated in the mounted state, or may have a detachable lid structure like a seal.

In addition, it may be desirable to attach a protective cap to the discharge portion 42 of the unused toner pack 40 so as to prevent leakage of toner during transportation. The protective cap is configured such that, for example, the protective cap engages with the cutout portions of the shutter member 41 and the discharge portion 42 in a state where the protective cap is mounted on the discharge portion 42, thereby regulating the relative rotation of the shutter member 41 and the discharge portion 42. When the protective cap is removed, the user can mount the toner pack 40 on the supply container mounting portion 701.

(1-6) Configuration of Supply Container Mounting Portion

Figure 9A:
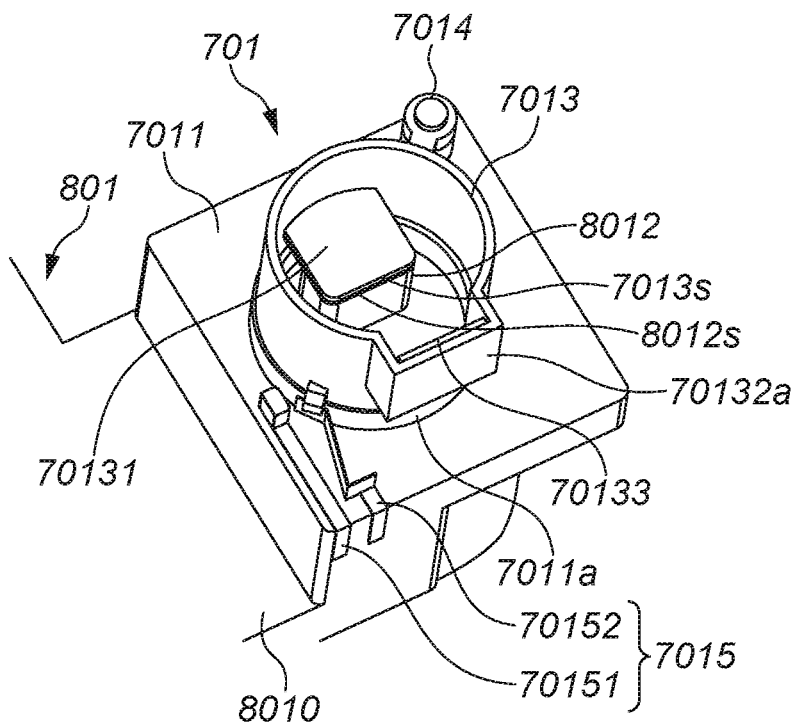
FIG. 9A is a perspective view of a supply container mounting portion according to the first exemplary embodiment.
Figure 9C:
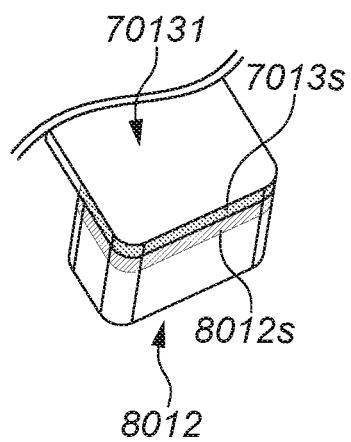
FIG. 9C is an enlarged view of a lid portion of the supply container mounting portion according to the first exemplary embodiment.
Figure 9B:
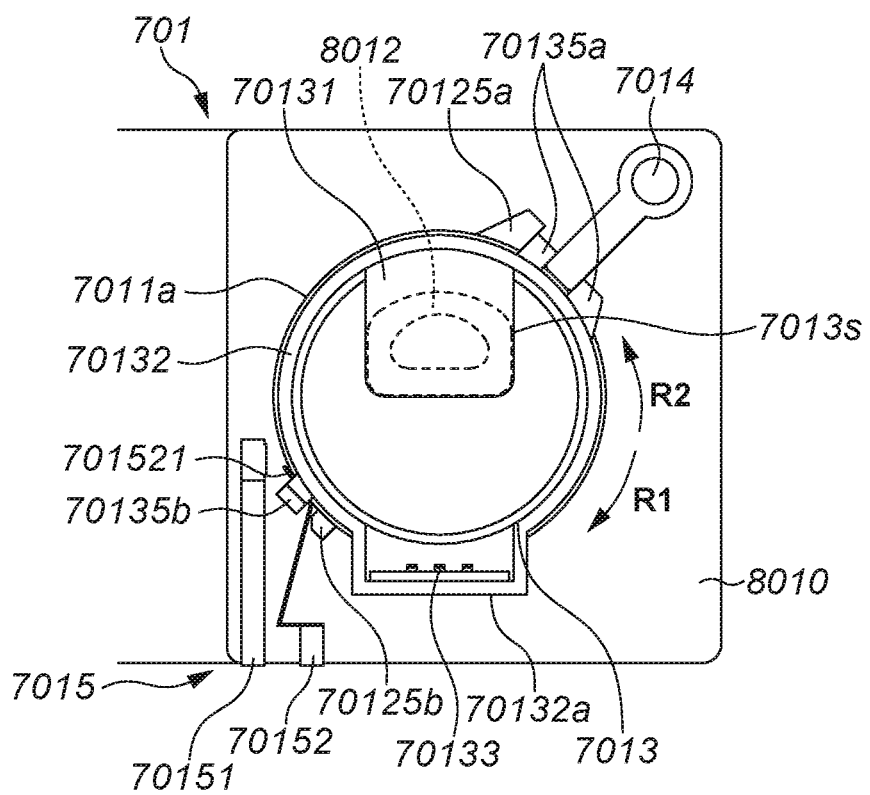
FIG. 9B is a top view of the supply container mounting portion according to the first exemplary embodiment.

A shutter opening/closing mechanism of the toner pack 40 and the toner receiving unit 801 and a lock mechanism of the shutter member 41 will be described. FIG. 9A is a perspective view of the supply container mounting portion 701. FIG. 9B is a top view of the supply container mounting portion 701. The supply container mounting portion 701 includes the supply port 8012, a supply port shutter 7013, a lock member 7014, and a rotation detection portion 7015.

The supply port 8012 is an opening that communicates with the toner containing portion 8011 (see FIGS. 6A to 6C) of the toner receiving unit 801, and is fixed to a frame 8010 of the toner receiving unit 801. The supply port shutter 7013 includes a lid portion 70131 that covers the supply port 8012, a tubular portion 70132 that receives the discharge portion 42 of the toner pack 40, and the contact portions 70133 to be connected to the contact portions 45a (see FIG. 8B) of the memory unit 45 of the toner pack 40. In the drawings, a portion of the tubular portion 70132 that covers the contact portions 70133 is indicated by a tubular portion 70132a. The supply port shutter 7013 is a member having a structure in which the lid portion 70131, the tubular portion 70132, and the contact portions 70133 are integrally formed with and is rotatably mounted on the frame 8010 of the toner receiving unit 801. Each conductor exposed in the corresponding contact portion 70133 is electrically connected to a controller of the image forming apparatus 1 mounted on the printer body 100 via a wire provided in the process cartridge 20 and a contact between the process cartridge 20 and the printer body 100.

The rotation detection portion 7015 serving as a rotation detection sensor is a mechanism for detecting the rotation of the supply port shutter 7013. The rotation detection portion 7015 according to the first exemplary embodiment is composed of two conductive plate springs 70151 and 70152. The plate spring 70152 is biased by a spring in the clockwise direction. When the plate spring 70152 is pressed by a protruding portion 70135a which is provided at the outer periphery of the supply port shutter 7013, the plate spring 70152 contacts the other plate spring 70151 at a leading end 701521. In other words, the rotation detection portion 7015 is an electric circuit configured to be switched between an electrically connected state and a disconnected state depending on a rotation angle (rotation position) of the supply port shutter 7013. As described below, a controller 90 (see FIG. 19) of the image forming apparatus 1 recognizes whether the discharge port 42a of the toner pack 40 communicates with the supply port 8012 of the supply container mounting portion 701 based on whether the rotation detection portion 7015 is electrically connected or disconnect. In other words, the controller 90 can determine that at least the process in which the discharge port 42a communicates with the supply port 8012 in the operation for supplying toner from the toner pack 40 by the user has normally been completed.

As illustrated in FIGS. 9A to 10C, protruding portions 70135a and 70135b are provided at an outer peripheral portion of the tubular portion 70132 of the supply port shutter 7013. The frame 8010 includes a shutter support portion 7011. The shutter support portion 7011 rotatably supports the tubular portion 70132 of the supply port shutter 7013. A plurality of protruding portions 70125a and 70125b is provided on a cylindrical portion 7011a of the shutter support portion 7011. The protruding portions 70125a and 70125b are located blow the protruding portion 70135a (on the right side in FIG. 10A) in the direction of gravitational force. The protruding portion 70125b allows passage of the protruding portion 70135a (on the right side in FIG. 10A) by a rotational movement. On the other hand, the protruding portion 70135a (on the left side in FIG. 10A) extends to a location which is at the same height as the protruding portion 70135a (on the right side in FIG. 10A) and which is at the height where the protruding portion 70135a overlaps the protruding portion 70125b. Accordingly, the protruding portion 70125b contacts the protruding portion 70135a (on the left side in FIG. 10A) according to the rotation angle (rotation position) of the supply port shutter 7013, thereby regulating the rotational movement of the protruding portion 70135a (on the left side in FIG. 10A).

Prior to the rotation in an R1 direction of the supply port shutter 7013, the protruding portion 70125a contacts the protruding portion 70135a (on the left side in FIG. 10A), thereby regulating the rotational movement in an R2 direction of the protruding portion 70135a. Further, the protruding portion 70135a (on the right side in FIG. 10A) contacts the lock member 7014, thereby regulating the rotational movement in the R1 direction of the lock member 7014. After the rotation in the R1 direction of the supply port shutter 7013, the protruding portion 70135b contacts the lock member 7014, which has moved to a lock position, thereby regulating the rotational movement in the R2 direction of the lock member 7014. Further, the protruding portion 70135a (on the right side in FIG. 10A) contacts the protruding portion 70125b, thereby regulating the further rotational movement in the R1 direction of the protruding portion 70135*a*. Assume that the supply port shutter 7013 is rotated in the R1 direction when the toner pack 40 is mounted thereon, and is rotated in the R2 direction when the toner pack 40 is removed therefrom.

Figure 11A:
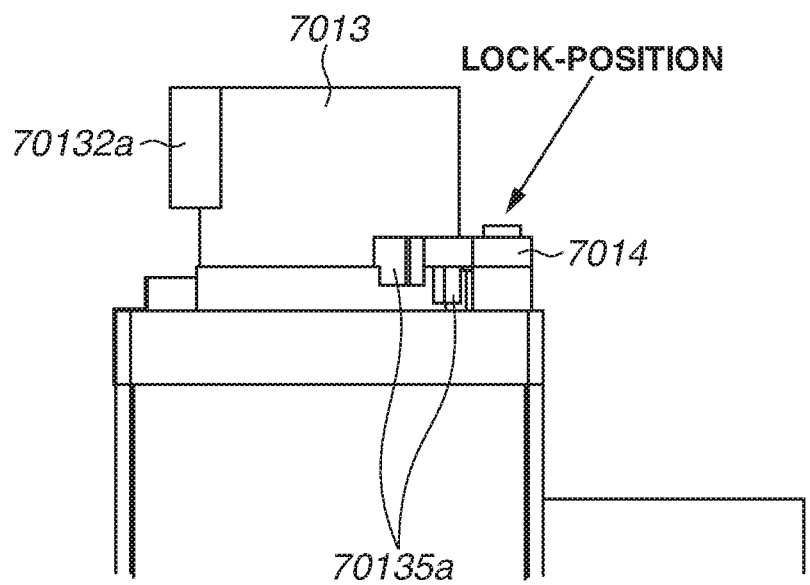
FIG. 11A illustrates a lock position of a lock member according to the first exemplary embodiment.
Figure 11B:
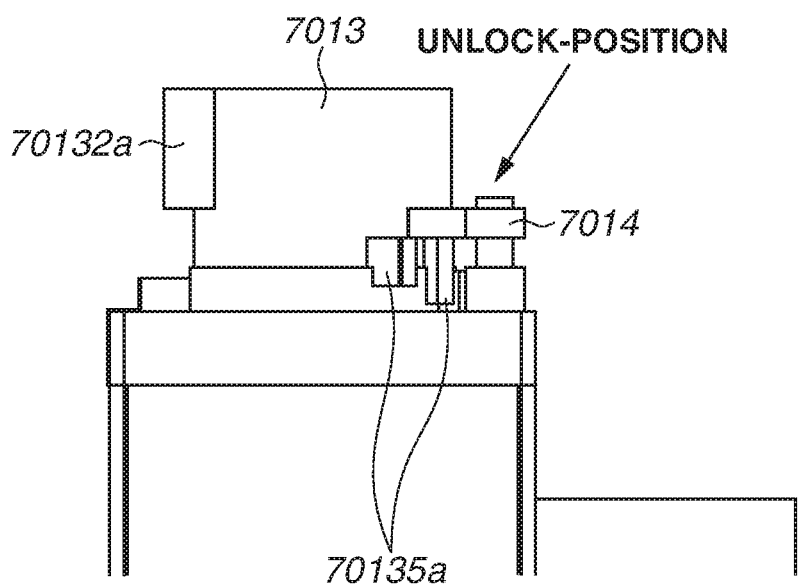
FIG. 11B illustrates an unlock position of the lock member according to the first exemplary embodiment.

The lock member 7014 is a member that regulates the rotation of the supply port shutter 7013. FIG. 11A illustrates a state where the lock member 7014 is located at the lock position. FIG. 11B illustrates a state where the lock member 7014 is located at an unlock position. The lock member 7014 can be shifted between the lock position (regulated position) and the unlock position (allowed position) by a vertical movement. When the lock member 7014 contacts the protruding portion 70135*a* of the supply port shutter 7013 at the lock position as illustrated in FIGS. 9B and 11A, the rotation of the supply port shutter 7013 is regulated. When the lock member 7014 is moved to the unlock position as illustrated in FIG. 11B, the lock member 7014 retracts from the movement locus of the protruding portion 70135*a* when the supply port shutter 7013 is rotated, thereby allowing the rotation of the supply port shutter 7013.

(1-7) Pressing Mechanism of Lock Member

Figure 13:
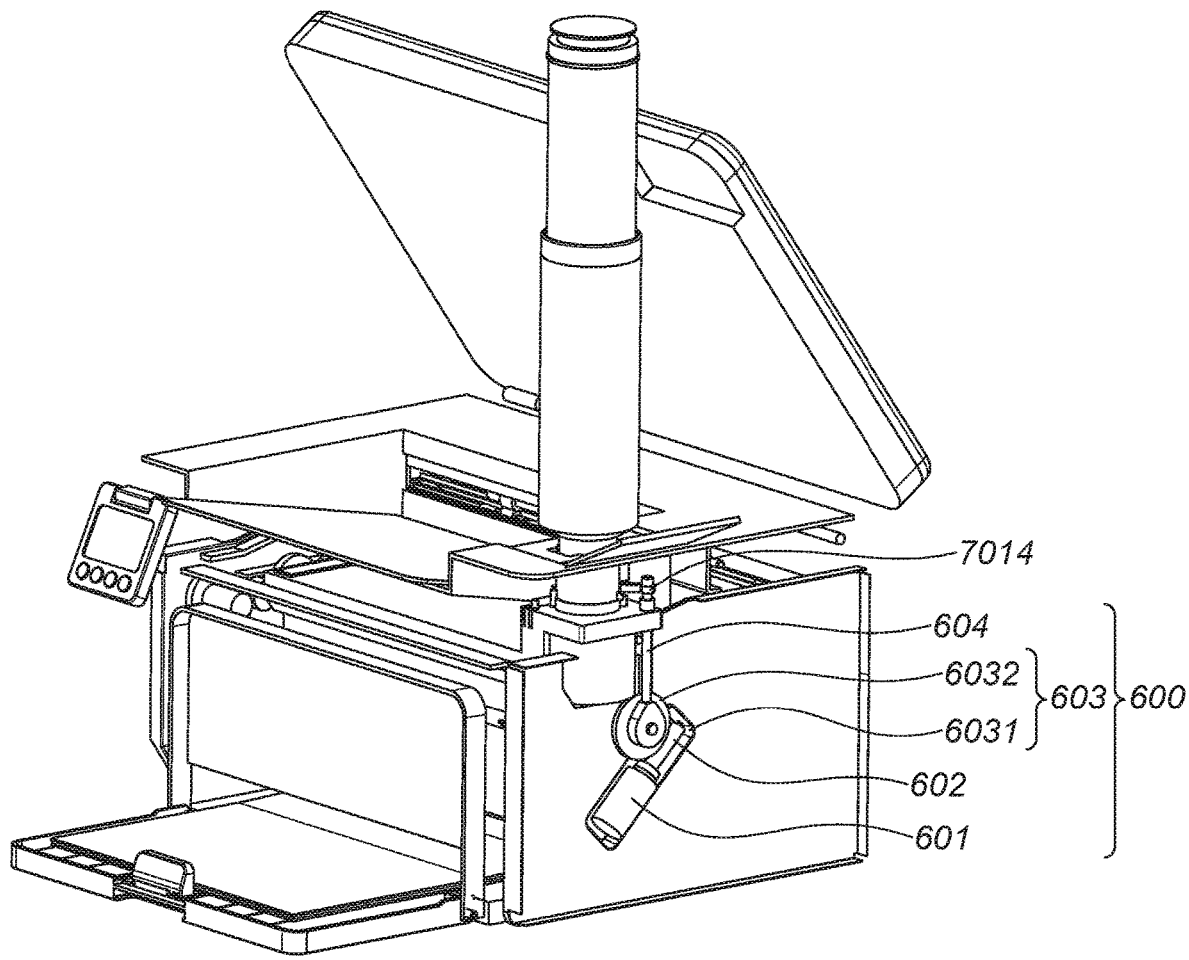
FIG. 13 is a view illustrating a pressing mechanism of the lock member according to the first exemplary embodiment.

A pressing mechanism 600 included in the image forming apparatus 1 will be described with reference to FIG. 13. The pressing mechanism 600 includes a motor 601, an input gear 602, a cam gear 603, and an advancing/retracting pin 604. The cam gear 603 includes a cam portion 6031 and a gear portion 6032.

The input gear 602 is composed of a crossed helical gear. The gear portion 6032 of the cam gear 603 is composed of a helical gear. A rotational motion received from the motor 601 can be transmitted to the gear portion 6032 from the input gear 602.

The advancing/retracting pin 604 is supported by a holding member (not illustrated) in such a manner that the advancing/retracting pin 604 can linearly move in the direction of gravitational force and in the direction opposite to the direction of gravitational force. As illustrated in FIG. 13, the advancing/retracting pin 604 contacts the cam portion 6031 of the cam gear 603, thereby linearly moving in the direction of gravitational force and in the direction opposite to the direction of gravitational force. In this case, the advancing/retracting pin 604 interlocks with the lock member 7014 of the toner receiving unit 801, and the advancing/retracting pin 604 moves the lock member 7014 in the direction of gravitational force and in the direction opposite to the direction of gravitational force.

A helical gear and a crossed helical gear are used in combination as the gear shape according to the first exemplary embodiment. However, the gear shape is not limited to the example as long as the rotation of the motor 601 can be converted into a linear motion. For example, a bevel gear may be used, or the cam gear 603 may be directly driven by the motor 601 by omitting the input gear 602.

(1-8) Flow of Supply Operation Using Toner Pack

Figure 10A:
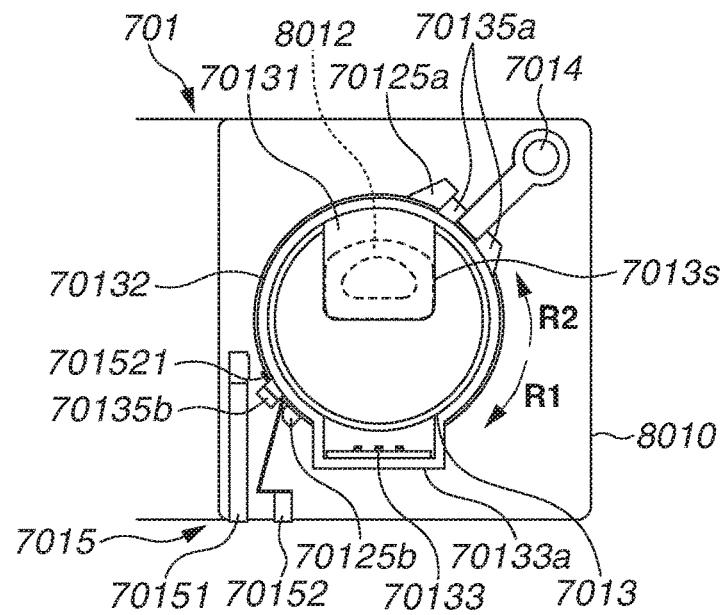
FIGS. 10A, 10B, and 10C are diagrams each illustrating an operation of the supply container mounting portion according to the first exemplary embodiment.
Figure 10B:
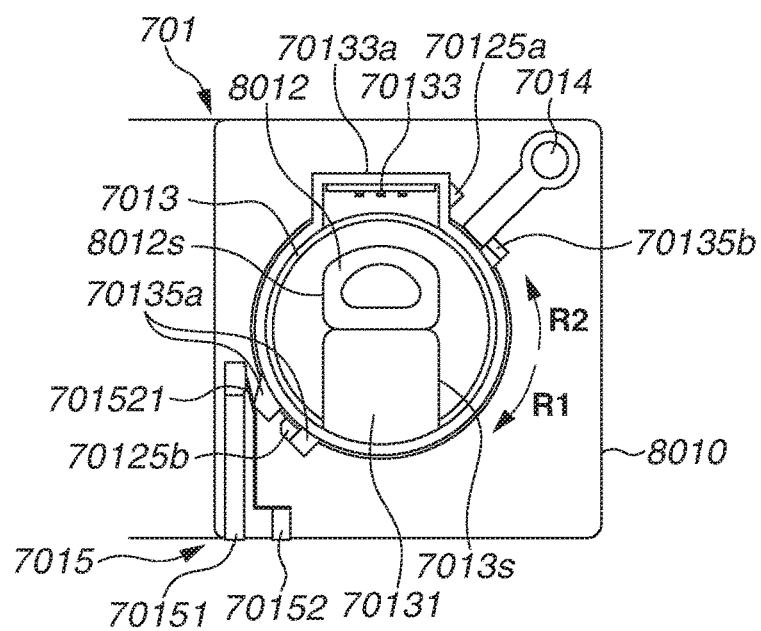
Figure 10C:
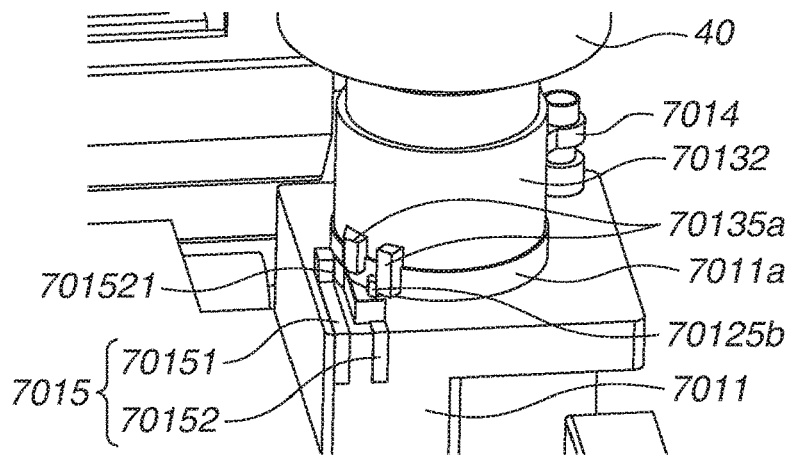

A series of operation for mounting the toner pack 40 on the supply container mounting portion 701 and dismounting the toner pack 40 after toner is supplied will be described based on the configurations of the toner pack 40, the supply container mounting portion 701, and the pressing mechanism 600 described above. FIG. 10A is a top view of the supply container mounting portion 701 when the supply port 8012 is in the closed state. FIG. 10B is a top view of the supply container mounting portion 701 when the supply port 8012 is in the open state. FIG. 10C is a perspective view of the supply container mounting portion 701 when the supply port 8012 is in the open state.

As illustrated in FIG. 10A, the supply port shutter 7013 in the closed state contacts the lock member 7014 in the rotation direction when the protruding portion 70135*a* is located at the lock position, so that the supply port shutter 7013 is fixed so as to be prevented from being rotated with respect to the supply port 8012. At this time, the lid portion 70131 of the supply port shutter 7013 completely covers the supply port 8012. The plate springs 70151 and 70152 of the rotation detection portion 7015 are separated from each other and the rotation detection portion 7015 is in the disconnected state.

In the case where the toner pack 40 is inserted into the supply container mounting portion 701, the user inserts the toner pack 40 by setting the cutout portions (see FIG. 12) of the discharge portion 42 and the shutter member 41 of the toner pack 40 to be aligned with the supply port 8012 and the lid portion 70131 of the supply port shutter 7013. As a result, the engagement surface 42*s* of the discharge portion 42 engages with an engagement surface 7013*s* (see FIG. 9C) which is a side surface of the lid portion 70131, and the engagement surface 41*s* of the shutter member 41 engages with an engagement surface 8012*s* (see FIG. 9C) which is provided at an outer peripheral portion of the supply port 8012. At this time, the discharge portion 42 that engages with the lid portion 70131 of the supply port shutter 7013 cannot be rotated until the supply port shutter 7013 is unlocked by the lock member 7014, and the discharge portion 42 can be rotated with the supply port shutter 7013 when the supply port shutter 7013 is unlocked. On the other hand, the shutter member 41 of the toner pack 40 cannot be rotated when the shutter member 41 engages with the supply port 8012 that is fixed to the frame 8010 of the toner receiving unit 801. In another configuration for engagement between the lid portion 70131 and the discharge portion 42, a protrusion that protrudes upward from the upper surface of the lid portion 70131 may be provided and a recess to engage with the protrusion may be provided in the lower surface 42*b* (see FIG. 12) of the discharge portion 42.

The insertion of the toner pack 40 allows the contact portions 45*a* (see FIG. 7A) of the memory unit 45 to contact the contact portions 70133 of the supply container mounting portion 701, so that information recorded on the memory unit 45 is read by the controller 90 of the image forming apparatus 1. The memory unit 45 stores information (new cartridge flag) indicating whether toner is contained in the toner pack 40 (whether the toner pack 40 is a used toner pack). The controller 90 reads the new cartridge flag, and in a case where the controller 90 determines that toner is contained in the currently mounted toner pack 40 (unused toner pack), the controller 90 controls the pressing mechanism 600 to push up the lock member 7014. As a result, the lock member 7014 is moved to the unlock position (see FIG. 11B) from the lock position.

In a state where the lock member 7014 is moved to the unlock position, the lock member 7014 is separated from the protruding portion 70135*a* of the supply port shutter 7013, which causes the supply port shutter 7013 to be rotatable (see FIG. 11B) in the R1 direction illustrated in FIGS. 10A and 10B. On the other hand, the protruding portion 70125*a* provided on the frame 8010 of the toner receiving unit 801 interferes with the protruding portion 70135*a* (see FIG. 10A), which regulates the rotation in the R2 direction of the supply port shutter 7013. In other words, as illustrated in FIG. 10A, the protruding portions 70125*a* and 70125*b* are located below the protruding portions 70135*a* and 70135*b* in the direction of gravitational force so that the protruding portions 70135*a* and 70135*b* can move and pass thereby in the rotation direction.

When the user grips the toner pack 40 and rotates the discharge portion 42 or a portion of the bag member 43 near the discharge portion 42 by 180 degrees in the R1 direction, the state illustrated in FIGS. 10B and 10C is obtained. The supply port shutter 7013 is rotated by 180 degrees together with the discharge portion 42 of the toner pack 40, so that the lid portion 70131 is moved from the position where the supply port 8012 is covered, and the supply port 8012 is exposed. The side surface of the lid portion 70131 is pressed by the engagement surface 42*s*, which is a part of the discharge portion 42, as the discharge portion 42 is rotated, and the lid portion 70131 is rotationally moved with the engagement surface 42*s*. When the discharge portion 42 is rotated by 180 degrees in a state where the shutter member 41 is fixed, the discharge port 42*a* of the toner pack 40 is exposed to the outside (see FIG. 8B) and faces the supply port 8012. As a result, the internal space of the toner pack 40 communicates with the internal space of the toner receiving unit 801 through the discharge port 42*a* and the supply port 8012, and thus toner filled in the bag member 43 flows down into the toner containing portion 8011.

The toner which has fallen into the toner containing portion 8011 is conveyed within the toner receiving unit 801 and reaches the developer container 32 as described above, so that the toner can be used for a development process. The development unit 802 may be configured to execute the development process even before newly supplied toner reaches the developer container 32, as long as a necessary amount of toner for maintaining the image quality is left in the developer container 32. In other words, toner can be supplied to the developer container 32 from the supply container, which is located outside the image forming apparatus 1, regardless of whether the image forming operation is being executed in the image forming portion 10 (see FIG. 1A).

The protruding portion 70125*b* is disposed (see FIGS. 10B and 10C) such that the protruding portion 70125*b* contacts the protruding portion 70135*a* of the supply port shutter 7013 when the supply port shutter 7013 is rotated by 180 degrees in the R1 direction from the state illustrated in FIG. 10A. In other words, like the protruding portion 70125*a*, the protruding portion 70125*b* is also located below the protruding portions 70135*a* and 70135*b* in the direction of gravitational force. Thus, the rotation of the supply port shutter 7013 in the R1 direction by more than 180 degrees is regulated. At the same time, the protruding portion 70135*a* of the supply port shutter 7013 presses the plate spring 70152 of the rotation detection portion 7015 to bring the leading end 701521 into contact with the plate spring 70151. When the rotation detection portion 7015 is in the electrically connected state, the controller 90 recognizes that the supply port shutter 7013 is in the open state, and operates the pressing mechanism 600 to move the lock member 7014 to the lock position again. Then, the lock member 7014 engages with the protruding portion 70135*b* of the supply port shutter 7013 to regulate the rotation in the R2 direction, thereby preventing the supply port shutter 7013 and the toner pack 40 from being rotated in any direction.

In a state where the discharge portion 42 of the toner pack 40 and the supply port shutter 7013 are rotated by 180 degrees as illustrated in FIGS. 10B and 10C, the following positional relationship is obtained. That is, the lid portion 70131 of the supply port shutter 7013 covers the upper portion of the shutter member 41 of the toner pack 40. Accordingly, even when the user tries to lift the toner pack 40 upward from the supply container mounting portion 701, the shutter member 41 interferes with the lid portion 70131, thereby regulating the movement of the toner pack 40. Therefore, unless the user performs an operation to dismount the toner pack 40 in a predetermined procedure as described below, the toner pack 40 is prevented from being separated from the supply container mounting portion 701.

When a condition for determining the completion of discharge of toner is satisfied after the discharge of toner from the toner pack 40 is started, the controller 90 operates the pressing mechanism 600 to move the lock member 7014 to the unlock position. In the present exemplary embodiment, the completion of discharge of toner is determined based on an elapsed time from a time when the rotation detection portion 7015 is electrically connected.

After the lock member 7014 is moved to the unlock position, the user can dismount the toner pack 40 by a procedure reverse to the procedure for mounting the toner pack 40. Specifically, the user grips and rotates the discharge portion 42 of the toner pack 40 or a portion of the bag member 43 near the discharge portion 42 by 180 degrees in the R2 direction which is opposite to the direction for mounting. Then, the supply port shutter 7013 is rotated by 180 degrees together with the discharge portion 42, and the supply port 8012 is covered with the lid portion 70131 of the supply port shutter 7013 as illustrated in FIG. 10A. The protruding portion 70135*a* (on the left side in FIG. 10A) of the supply port shutter 7013 contacts the protruding portion 70125*a*, thereby regulating the rotation of the supply port shutter 7013 by more than 180 degrees in the R2 direction.

In a state where the discharge portion 42 of the toner pack 40 is rotated by 180 degrees in the R2 direction, the position of the cutout portion of the discharge portion 42 is aligned with the position of the cutout portion of the shutter member 41 (see FIG. 12). Accordingly, when the toner pack 40 is moved upward, the shutter member 41 does not interfere with the lid portion 70131 of the supply port shutter 7013, so that the user can dismount the toner pack 40 from the supply container mounting portion 701 by gripping and lifting the toner pack 40.

In the process in which the supply port shutter 7013 is rotated by 180 degrees in the R2 direction, the protruding portion 70135*a* is separated from the plate spring 70152 and the rotation detection portion 7015 enters the disconnected state again. Then, the controller 90 recognizes that the supply port shutter 7013 is closed, and operates the pressing mechanism 600 to move the lock member 7014 to the lock position. Thus, the supply container mounting portion 701 is restored to an initial state before the toner supply operation is performed. For example, the controller 90 may determine that a predetermined condition for moving the lock member 7014 to the unlocked state is satisfied based on a lapse of predetermined period of time from the time when the rotation detection portion 7015 is electrically connected. A trigger for moving the lock member 7014 to the lock position may be an electrical disconnection between the contact portions 70133 of the supply container mounting portion 701 and the contact portions 45*a* of the toner pack 40 (see FIG. 7A) which occurs when the toner pack 40 is pulled out from the supply container mounting portion 701.

While the present exemplary embodiment illustrates the positional relationship in which the discharge port 42*a* of the toner pack 40 communicates with the supply port 8012 by rotating the toner pack 40 by 180 degrees, the rotation angle for allowing the communication therebetween can be changed as long as the toner pack 50 can be dismounted by an operation similar to the operation described in the present exemplary embodiment.

(1-9) Panel

Next, a panel 400 will be described. As illustrated in FIGS. 1B, 14A, 14B, and 14C, the panel 400 is provided, for example, on a front surface of a housing of the printer body 100. The panel 400 is an example of a display unit that displays information about the remaining amount of toner in the developer container 32 (or the available storage capacity of the developer container 32). The panel 400 is composed of a liquid crystal panel including a plurality of scales (indicators). In the present exemplary embodiment, three scales 4001, 4002, and 4003 are arranged in this order from top to bottom in the vertical direction. The panel 400 presents the amount of toner that can be supplied to the developer container 32 by displaying the scales 4001 to 4003 which change stepwise. The controller 90 updates the display of the panel 400 as needed based on the recognition of completion of the supply operation to be described below. If the completion of the supply operation is not reflected in the actual toner remaining amount, the toner remaining amount may be further detected and the panel display may be updated. For example, after the controller 90 turns on the scale 4002, if an optical sensor (51a and 51b, see FIG. 6A) detects that the actual toner remaining amount is not sufficient, the controller 90 turns off the scale 4002 and updates the display of the panel 400. The lowermost scale 4003 indicates that the amount of toner contained in the developer container 32 is at a low level or an out level. The term "low level" refers to a level at which it is desirable to supply tonner to the developer container 32, but a minimum amount of toner for maintaining the image quality is left in the developer container 32 and the image forming operation can be executed at the current moment. The term "out level" refers to a level at which almost no toner is left in the developer container 32 and the image forming operation cannot be executed.

Figure 14A:
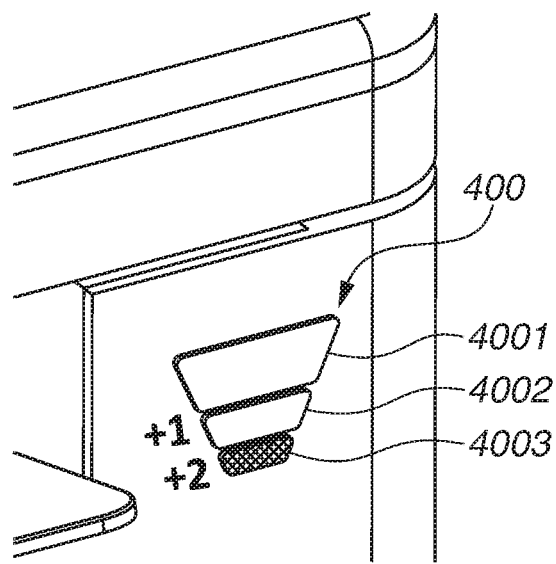
FIGS. 14A, 14B, and 14C are diagrams each illustrating a panel according to the first exemplary embodiment.
Figure 14B:
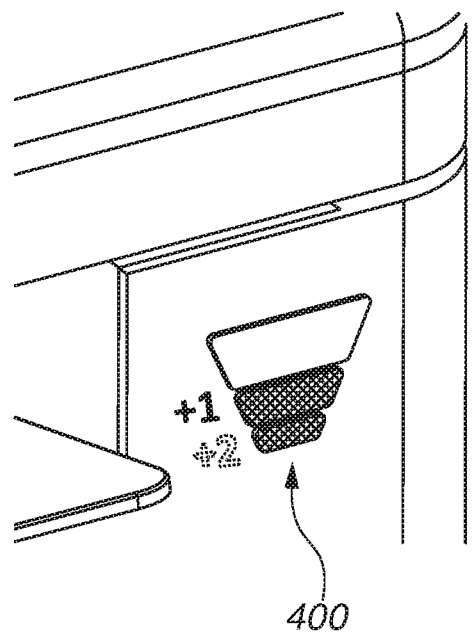
Figure 14C:
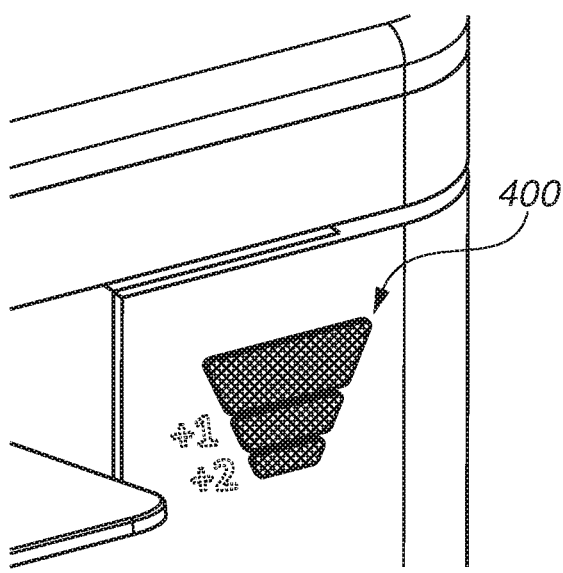

In the configuration example of the panel 400 illustrated in the FIGS. 14A, 14B and 14C, a case where all the three scales 4001, 4002, and 4003 are turned off indicates that the amount of toner contained in the developer container 32 is at the "out level" (fourth state).

As illustrated in FIG. 14A, a case where only the lowermost scale 4003 is turned on indicates that the remaining amount of toner in the developer container 32 is at the low level. In this state, two scales are turned off, which indicates that, for example, the amount of toner corresponding to two toner packs 40 can be supplied (third state). In addition, number panels indicating "+1" and "+2" displayed at locations adjacent to the scales are turned on, which indicates that the amount of toner corresponding to two toner packs 40 can be supplied.

As illustrated in FIG. 14B, a case where the lowermost scale 4003 and the center scale 4002 are turned on and the uppermost scale 4001 is turned off indicates that the toner remaining amount in the developer container 32 is more than the low level and is less than a full level (a level at which toner is filled up). In this state, one scale is turned off, which indicates that, for example, the amount of toner corresponding to one toner pack 40 can be supplied (second state). In addition, the number panel indicating "+1" adjacent to the scale is turned on and the number panel indicating "+2" is turned off, which indicates that the amount of toner corresponding to one toner pack 40 can be supplied.

As illustrated in FIG. 14C, a case where all the three scales 4001 to 4003 are turned on indicates that the toner remaining amount in the developer container 32 is at the full level. In this state, no scales are turned off, which indicates that, for example, no toner can be supplied from the toner pack 40 (first state). In addition, the number panels indicating "+1" and "+2" adjacent to the scales are turned off, which indicates that no toner can be supplied from the toner pack 40.

The panel 400 illustrated in FIGS. 14A, 14B, and 14C is an example of the display unit on which the display content is changed depending on the toner remaining amount in the developer container 32. Configurations other than the panel 400 may also be used as the display unit. For example, instead of using a liquid crystal panel, a panel may be configured using a combination of a light source, such as an LED or incandescent lamp, and a diffusing lens. Only the number panels may be used without the scales, or only the scales may be used without the number panels.

The number of scales and the display method of the panel 400 can be arbitrarily changed. For example, the lower scale may be blinked when the toner remaining amount in the developer container 32 is at the low level, thereby prompting the user to supply toner.

[Description of Image Forming Apparatus Incorporating Near Field Communication Unit]

Figure 20:
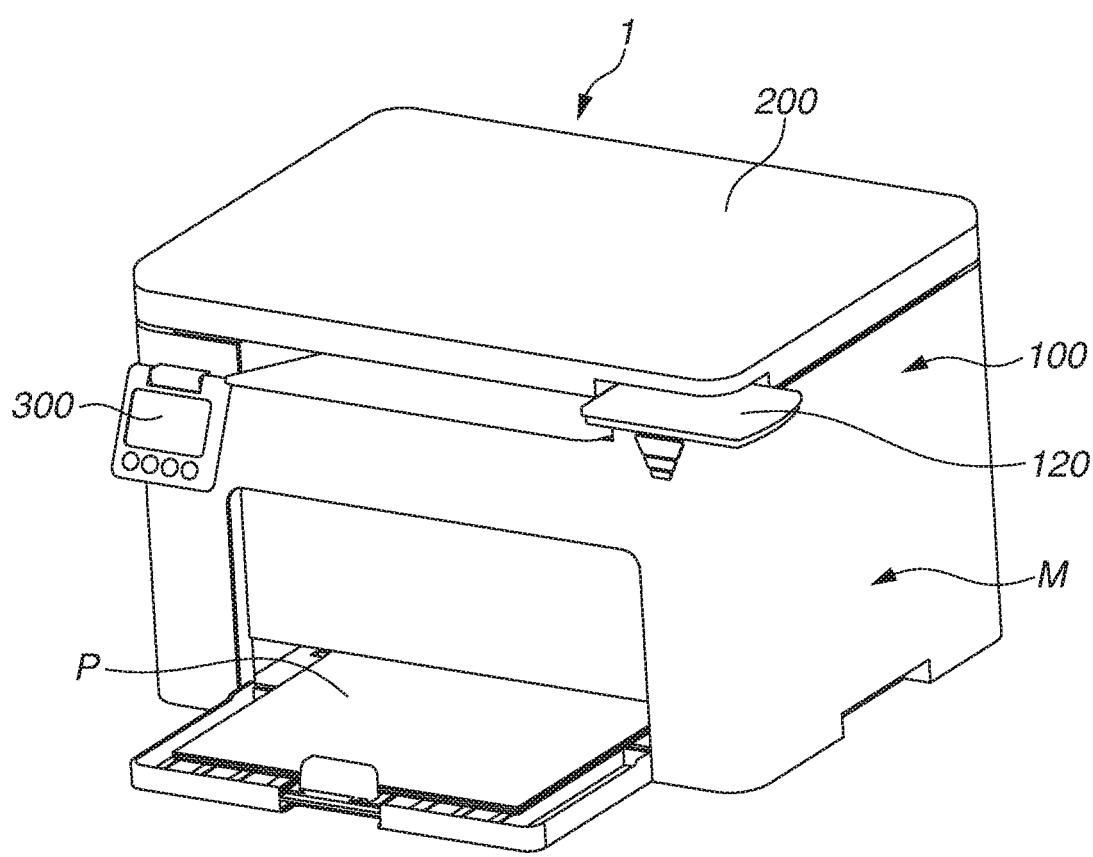
FIG. 20 is a perspective view of the image forming apparatus in which a near field communication (NFC) unit according to the first exemplary embodiment is disposed.
Figure 21:
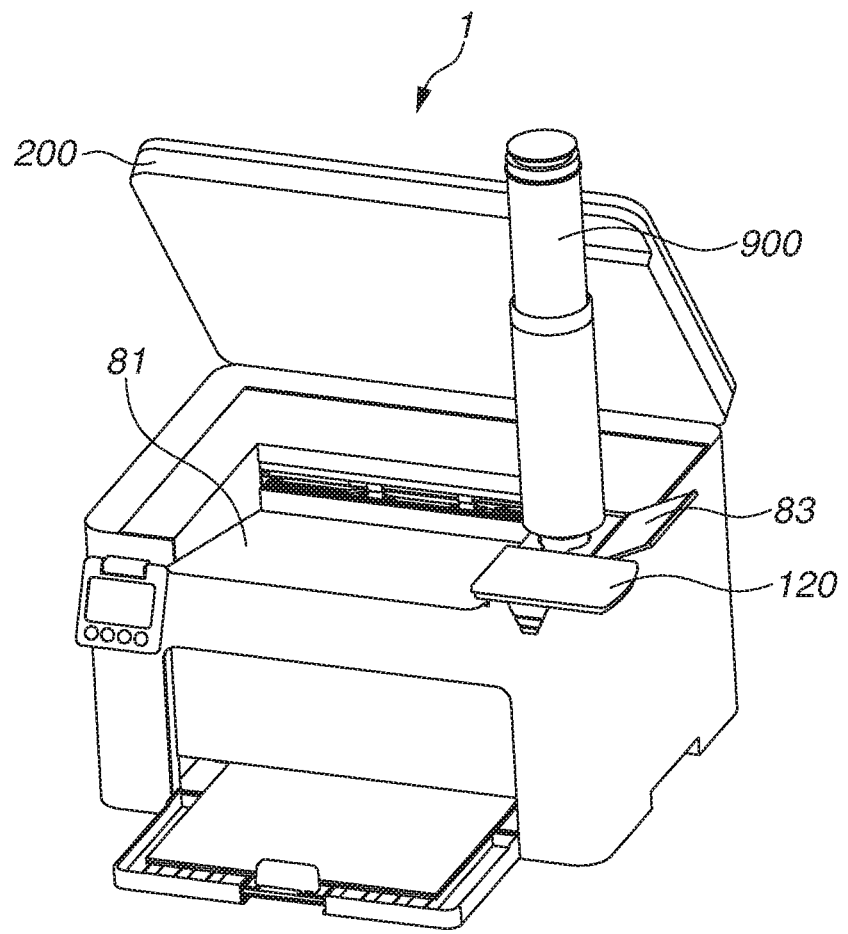
FIG. 21 is a perspective view illustrating a state where a toner bottle is mounted in a toner supply port of the image forming apparatus illustrated in FIG. 20 according to the first exemplary embodiment.
Figure 22:
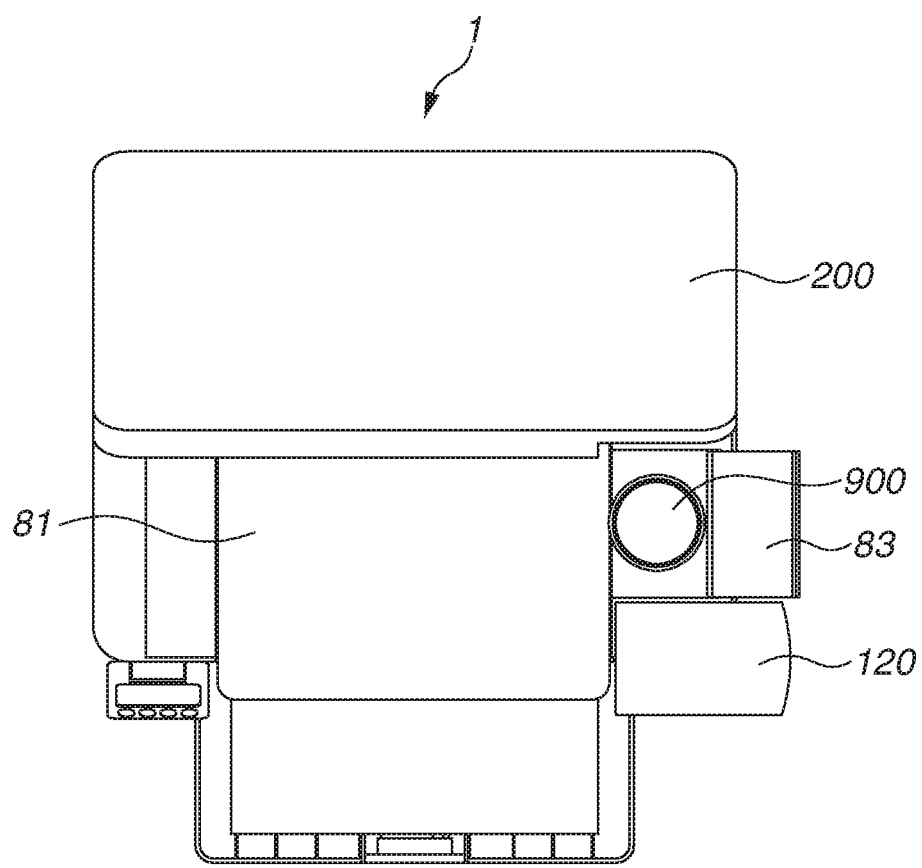
FIG. 22 is a top view illustrating a state where the toner bottle is mounted in the toner supply port of the image forming apparatus illustrated in FIG. 20 according to the first exemplary embodiment.
Figure 23:
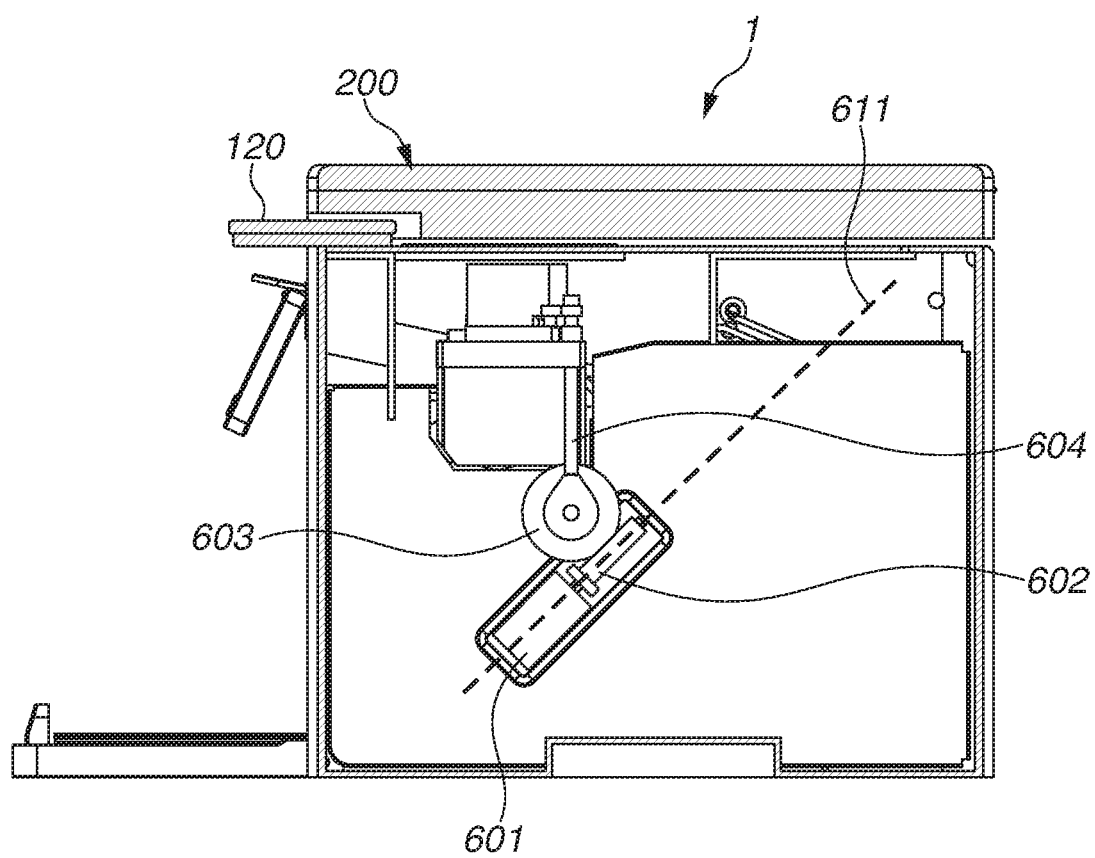
FIG. 23 is a view illustrating the image forming apparatus according to the first exemplary embodiment, in which the illustration of an outer package is omitted, as viewed from a direction indicated by an arrow M in FIG. 20.

In the present exemplary embodiment, near field communication (NFC) is used as a non-contact communication method for controlling a toner supply control mechanism that controls whether toner supply from a toner bottle unit 900 is executable. A configuration in which an NFC unit is installed as a non-contact communication portion for performing NFC communication in the image forming apparatus 1 illustrated in FIG. 4A will be described in detail below with reference to FIGS. 20, 21, 22, and 23. FIG. 20 is a perspective view illustrating am example where an NFC unit 120 is installed in the image forming apparatus 1 illustrated in FIG. 4A. FIG. 21 is a perspective view illustrating a state where the toner bottle unit 900 is mounted on the image forming apparatus 1 including the NFC unit 120 illustrated in FIG. 20. FIG. 22 is a top view of the image forming apparatus 1 on which the toner bottle unit 900 illustrated in FIG. 21 is mounted. FIG. 23 is a view illustrating the image forming apparatus 1, in which the illustration of an outer package is omitted, as viewed from the direction indicated by the arrow M in FIG. 20.

The NFC unit 120 includes an antenna and is disposed on the right side of the main body as viewed from the front side of the main body (see FIG. 20). In the present exemplary embodiment, the NFC unit 120 is mounted on the outside of the main body, but instead may be disposed in a cover made of a material that transmits electromagnetic waves.

In a case where the user supplies toner, the user opens the reader 200 to mount the toner bottle unit 900 on a supply port (see FIG. 21), and holds a known NFC card (not illustrated), which serves as an authentication unit for performing authentication, over the NFC unit 120. In response to this user operation, the image forming apparatus 1 receives a signal from the NFC card held over the NFC unit 120, and performs user authentication. When the user has an authority for maintenance of the image forming apparatus 1, the user drives and controls the toner supply control mechanism to perform the toner supply operation. The term "non-contact communication" used herein refers to communication to be established by holding an NFC card over the NFC unit 120.

As illustrated in FIG. 22, the NFC unit 120, as well as the toner supply port, is provided on the right side of the main body (one side of the discharge tray 81) as viewed from the front side of the main body. Specifically, the NFC unit 120 and the motor 601 that moves the lock member 701 to regulate the rotation of the toner bottle unit 900 are disposed on the right side of the main body as viewed from the front side of the main body. In addition, the NFC unit 120 is not disposed on the reader 200, but is disposed on the upper surface of the main body excluding the area of the discharge tray 81. In the direction orthogonal to the rotation axis of the reader 200, the NFC unit 120 is disposed in an area other than the area between the rotation axis of the reader 200 and the toner supply port. Further, in the first exemplary embodiment, the NFC unit 120 is installed at a position away from an axial line 611 of the motor 601 (see FIG. 23). With this arrangement, the NFC unit 120 can be disposed at a location where the NFC unit 120 is less likely to be affected by the magnetic line of force of the motor 601.

With the above-described configuration, the following advantageous effects can be obtained.

(1) In the configuration in which the NFC unit is disposed on the upper surface of the reader, in the case in which the supply port is hidden behind the reader 200 when the reader is closed, the reader needs to be inclined to mount the toner bottle during the toner supply operation. As a result, it is difficult to cause the NFC card to contact the NFC unit on the upper surface of the reader 200, which causes deterioration in operability. On the other hand, if the NFC unit 120 is not disposed on the upper surface of the reader 200, but is disposed on the upper surface of the main body as described in the present exemplary embodiment, it is possible to cause the NFC card to easily contact the NFC unit 120 even in a state where the toner bottle is mounted. This results in an improvement in operability of authentication operation during NFC communication for toner supply.

(2) In the case in which the NFC unit and the toner supply port are disposed such that the NFC unit and the toner supply port do not overlap the reader in any one of a plurality of attitudes (at least the closed state) as viewed from above the main body, toner can be supplied without opening the reader. However, this results in an increase in the size of the main body. In contrast to the foregoing, as described in the present exemplary embodiment, if the NFC unit 120 and the toner supply port are disposed such that the NFC unit 120 and the toner supply port overlap the reader in any one of the plurality of attitudes (at least the closed state), an increase in the size of the main body can be prevented.

(3) In the direction orthogonal to the rotation axis of the reader 200, the NFC unit 120 is disposed at a position other than the position between the rotation axis and the toner supply port, thereby preventing the NFC unit 120 from being hidden behind the toner bottle mounted during the toner supply operation. With the configuration, the user can recognize the NFC unit 120 and also cause the NFC card to easily contact the NFC unit 120.

(4) The NFC unit 120 and the toner supply port are disposed on the same side of the main body, which leads to an improvement in operability.

(5) As illustrated in FIG. 23, the NFC unit 120 is located at a position away from the axial line 611 of the motor 601. Thus, when the user causes the image forming apparatus 1 to read a signal from the NFC card, the adverse effect of the magnetic line of force of the motor 601 can be reduced, so that the image forming apparatus 1 can more reliably receive (communicate) a signal. In addition, noise in the received signal caused due to the effect of the magnetic force can be reduced, and the occurrence of malfunction can be prevented.

The above-described five advantageous effects can be obtained by providing the NFC unit 120 at a predetermined arrangement position in the image forming apparatus 1.

(2) First Modified Example

As another example of the supply container, a configuration according to a first modified example in which a bottle-like toner bottle unit is used instead of a bag-like toner pack will be described with reference to FIGS. 15A, 15B, 15C, and 15D. The toner bottle unit is configured to be detachably mountable on the supply container mounting portion 701 described above, like the above-described toner pack 40. Accordingly, descriptions of components of the image forming apparatus 1 that are similar to those of the first exemplary embodiment are omitted.

(2-1) Configuration of Toner Bottle Unit

Figure 15A:
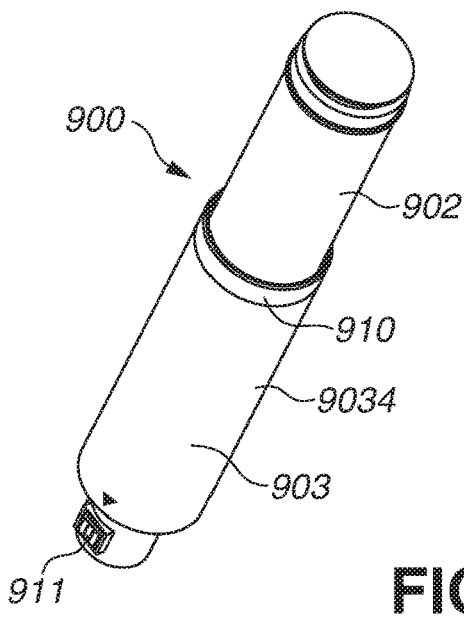
FIGS. 15A and 15B are perspective views each illustrating a toner bottle unit according to a first modified example.
Figure 15B:
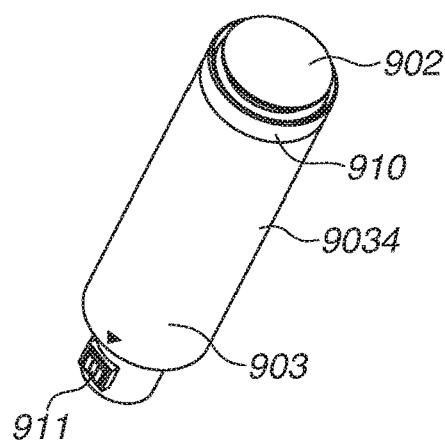
Figure 15C:
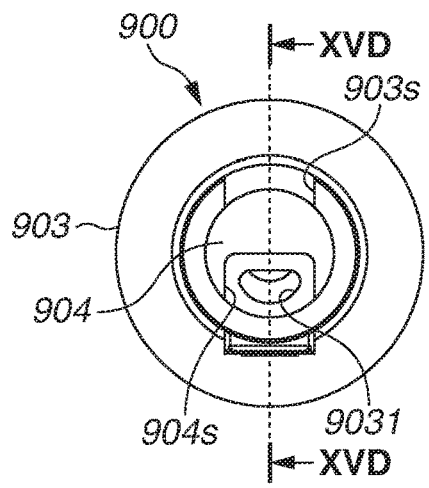
FIG. 15C is a bottom view of the toner bottle unit according to the first modified example.
Figure 15D:
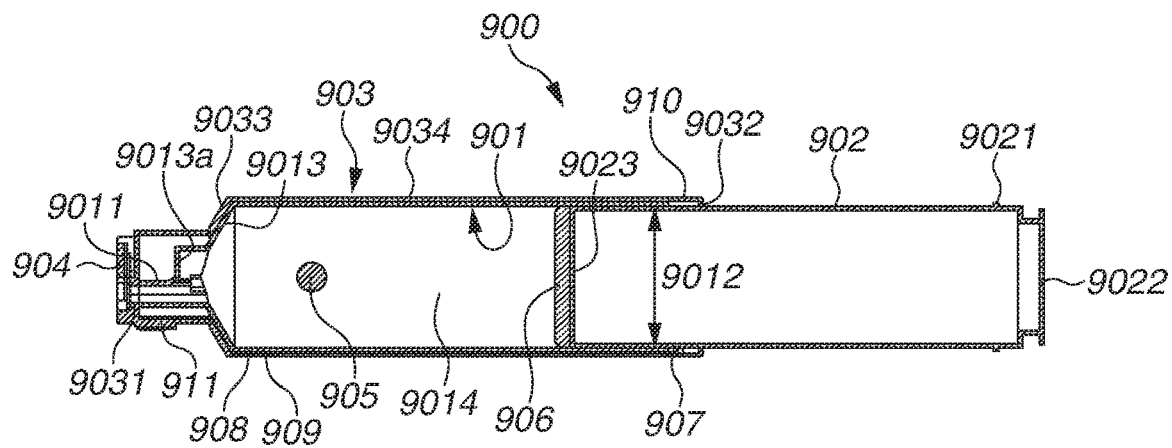
FIG. 15D is a sectional view of the toner bottle unit taken along a line XVD-XVD in FIG. 15C.

FIG. 15A is a perspective view illustrating the appearance of the toner bottle unit 900. FIG. 15B is a perspective view illustrating the toner bottle unit 900 after toner is discharged. FIG. 15C is a view illustrating the toner bottle unit 900 as viewed from the bottom of a piston. FIG. 15D is a sectional view of the toner bottle unit 900 taken along a line XVD-XVD in FIG. 15C.

FIG. 16A is a perspective view of the toner bottle unit 900 in which an outer cylinder 903 (see FIG. 15A) is not illustrated. FIG. 16B is a perspective view of the toner bottle unit 900 without the outer cylinder 903 after toner is discharged. FIG. 16C illustrates a state of a component related to push-in detection of the toner bottle unit 900 before a push-in operation is performed. FIG. 16D illustrates a state of the component related to push-in detection after the push-in operation is performed. FIG. 16E illustrates a state of a component related to rotation detection of the toner bottle unit 900 before a rotation operation is performed. FIG. 16F illustrates a state of the component related to rotation detection of the toner bottle unit 900 after the rotation operation is performed.

As illustrated in FIGS. 15A and 15D, the toner bottle unit 900 mainly includes the outer cylinder 903, an inner cylinder 901, a piston 902, a shutter member 904, and a memory unit 911. The outer cylinder 903 and the inner cylinder 901 have a tubular shape, and the inner cylinder 901 is fit inside the outer cylinder 903. The piston 902 is fit inside the inner cylinder 901, and is slidable with respect to the inner cylinder 901. A direction in which the piston 902 moves (axial direction of each of the outer cylinder 903 and the inner cylinder 901) is hereinafter referred to as an axial direction of the toner bottle unit 900. The piston 902 is an example of a pressing member.

The inner cylinder 901 includes a cylindrical toner containing portion 9014 that contains toner, a bottom portion 9013 provided at one end the inner cylinder 901 in the axial direction of the toner bottle unit 900, and a discharge port 9011 provided on the bottom portion 9013. The inner cylinder 901 has a cylindrical shape in which one end in the axial direction of the toner containing portion 9014 is closed with the bottom portion 9013. The other end of the toner containing portion 9014 is provided with an opening 9012, and the piston 902 is inserted into the toner containing portion 9014 through the opening 9012. The inner cylinder 901 includes a spherical weight member 905 that is movable inside the toner containing portion 9014.

The outer cylinder 903 includes a cylindrical inner cylinder accommodating portion 9034 that accommodates the toner containing portion 9014 of the inner cylinder 901 therein, a bottom portion 9033 provided at one end of the outer cylinder 903 in the axial direction of the bottle unit 900, and a discharge port 9031 provided on the bottom portion 9033. Like the inner cylinder 901, the outer cylinder 903 has a cylindrical shape in which one end in the axial direction of the inner cylinder accommodating portion 9034 is closed with the bottom portion 9033, and holds the inner cylinder 901 such that a relative movement of the inner cylinder 901 is disabled. The other end of the inner cylinder accommodating portion 9034 is provided with an opening 9032 through which the piston 902 is inserted. While FIG. 15D illustrates only one weight member 905 (movable member), the number of movable members can be changed as described below.

The discharge port 9011 of the inner cylinder 901 has an elongated tube shape extending from the bottom portion 9013 to one side in the axial direction. The discharge port 9031 of the outer cylinder 903 is provided at a position corresponding to the discharge port 9011 of the inner cylinder 901 on the bottom portion 9033. The discharge port 9031 of the outer cylinder 903 is a discharge port through which toner contained in the toner containing portion 9014 is discharged to the outside of the toner bottle unit 900. A retracting space 9013a for preventing the weight member 905 from blocking the discharge port 9011 during a piston push-in operation is provided at a position adjacent to the discharge port 9011 of the inner cylinder 901.

The bottom portion 9013 of the inner cylinder 901 has an inclined shape in which the sectional area decreases toward the discharge port in the axial direction (in particular, a conical shape with an inner diameter that decreases toward the discharge port in the axial direction). The bottom portion 9033 of the outer cylinder 903 that faces the bottom portion 9013 of the inner cylinder 901 has an inclined shape similar to that of the bottom portion 9013. The discharge port 9011 and the retracting space 9013a of the inner cylinder 901 are provided at a vertex portion of the inclined shape of the bottom portion 9033. The weight member 905 has a spherical shape and is guided by the bottom portion 9013 and is moved to the retracting space 9013a with gravity.

The piston 902 includes an elastic member 906 that is mounted at an end portion 9023 on one end side (discharge port side) in the axial direction, and a push-in rib 9021 that is provided in the vicinity of an end portion 9022 (a portion to be pressed by the user during the piston push-in operation) located on the other end side. The elastic member 906 is configured to contact the inner peripheral surface of the toner containing portion 9014 with no gap formed therebetween, and has a function of preventing leakage of toner during the piston push-in operation. The push-in rib 9021 has a protruding shape that protrudes to the outside in the radial direction from the outer peripheral surface of the piston 902.

The configuration of the shutter member 904 is similar to that of the shutter member 41 that is provided on the above-described toner pack 40. Specifically, as illustrated in FIG. 15C, the shutter member 904 has a shape in which a part of a disk that is rotatable relatively to the outer cylinder 903 is cut out. A side surface of the cutout portion that forms the thickness of the shutter member 904 functions as an engagement surface 904s. The outer cylinder 903 also has a shape with a cutout portion. The outer cylinder 903 includes an engagement surface 903s that is parallel to the engagement surface 904s in the cutout portion. The discharge port 9031 is provided at a position away from the engagement surface 903s by about 180 degrees in the circumferential direction of the outer cylinder 903.

FIG. 15C illustrates a state where the discharge port 9031 is already exposed to the outside. However, in the toner bottle unit 900 before shipment, the position of the cutout shape of the engagement surface 903s of the outer cylinder 903 is aligned with the position of the cutout shape of the engagement surface 904s of the shutter member 904. In this case, the discharge port 9031 is covered with the shutter member 904 and thus the sealed state of the toner containing portion 9014 is maintained (closed state). As illustrated in FIG. 15C, when the shutter member 904 is rotated by 180 degrees with respect to the outer cylinder 903, the discharge port 9031 is exposed to the outside through the cutout portion of the shutter member 904, so that the sealed state of the toner containing portion 9014 is released and toner can be discharged (open state). The configurations of the discharge port 9031, the engagement surface 903s, and the shutter member 904 are basically similar to the configuration of the shutter member 41 described above with reference to FIGS. 7B, 8B, and 12.

The memory unit 911 serving as a storage unit that stores information about the toner bottle unit 900 is mounted in the vicinity of the discharge port 9031 of the outer cylinder 903. The memory unit 911 includes a plurality of metallic plates 9111, 9112, and 9113 (see FIG. 16A) exposed to the outside of the toner bottle unit 900 as contact portions 911a that contact the contact portions 70133 (see FIG. 9A) of the supply container mounting portion 701.

(2-2) Piston Push-In Detection Mechanism

As illustrated in FIGS. 16A and 16C, a push-in detection rod 907, a first contact plate 908, and a second contact plate 909 are disposed between the outer cylinder 903 and the inner cylinder 901 as a push-in detection mechanism for detecting the push-in operation of the piston 902. The push-in detection rod 907 is formed of an insulating material such as resin. The first contact plate 908 and the second contact plate 909 are each formed of a conductive material such as metal. The push-in detection rod 907 includes a contact releasing portion 9072 that is formed at one end side (discharge port side) in the axial direction, and a piston contact portion 9071 that can contact the push-in rib 9021 of the piston 902 on the other end side in the axial direction. The push-in detection rod 907 interlocks with the push-in operation of the piston 902 and the piston contact portion 9071 is pressed by the push-in rib 9021 and is thus moved in the axial direction.

The push-in detection rod 907 is fit into, for example, an axial groove shape formed in the outer peripheral surface of the inner cylinder 901 or in the inner peripheral surface of the outer cylinder 903, so that the push-in detection rod 907 is movably held in the axial direction with respect to the inner cylinder 901 and the outer cylinder 903, while the movement in the direction vertical to the axial direction is regulated. The piston contact portion 9071 has a shape that is bent vertically with respect to the axial direction, i.e., an L-shape, and is configured to more reliably contact the push-in rib 9021. While FIG. 16A illustrates an example where the push-in rib 9021 is provided over the perimeter of the outer peripheral surface of the piston 902, the push-in rib 9021 may be formed only at a position in the peripheral direction corresponding to the piston contact portion 9071.

The first contact plate 908 and the second contact plate 909 are metallic plates that are switched between the electrically connected state and the electrically disconnected state depending on the position of the push-in detection rod 907 formed of insulating resin. A new cartridge detection method for the toner bottle unit 900 using the first contact plate 908 and the second contact plate 909 will be described below.

Further, a cylinder cover 910 (see FIG. 15A) is provided at an opening-side end of the outer cylinder 903, thereby preventing the push-in detection rod 907 from being dismounted. Specifically, the cylinder cover 910 constituting the opening 9032 of the outer cylinder 903 is located (see FIG. 15D) on the inner side of the outer end position in the radial direction of the piston contact portion 9071 (see FIG. 16B). Accordingly, even when a force for moving the push-in detection rod 907 toward the opening side in the axial direction opening is applied, the piston contact portion 9071 interferes with the cylinder cover 910, thereby preventing the push-in detection rod 907 from being dismounted from the toner bottle unit 900.

(2-3) Determination as to Whether Toner Bottle Unit is New or Used

Next, a configuration for detecting whether the toner bottle unit 900 is unused (new toner bottle) or used when the toner bottle unit 900 is mounted on the supply container mounting portion 701 will be described. As illustrated in FIGS. 16C and 16D, the contact releasing portion 9072 of the push-in detection rod 907 is located in the vicinity of the first contact plate 908 and the second contact plate 909.

FIG. 16C illustrates a state of the push-in detection rod 907 before the piston push-in operation illustrated in FIG. 16A, and illustrates a state where the first contact plate 908 and the second contact plate 909 contact each other and thus are in the electrically connected state. In this case, it may be desirable to form one of the first contact plate 908 and the second contact plate 909, which are made of metal, into a plate spring shape, and to bring the one of the first contact plate 908 and the second contact plate 909 into press contact with the other one of the first contact plate 908 and the second contact plate 909. For example, the electrical connection between the first contact plate 908 and the second contact plate 909 can be more reliably established by coating conductive grease on a contact surface between the first contact plate 908 and the second contact plate 909.

FIG. 16D illustrates a state of the push-in detection rod 907 after the piston push-in operation illustrated in FIG. 16B, and illustrates a state where the first contact plate 908 and the second contact plate 909 are in the disconnected state. In this state, the contact releasing portion 9072 of the push-in detection rod 907 that is pushed in by the push-in rib 9021 is disposed between the first contact plate 908 and the second contact plate 909, thereby physically separating the first contact plate 908 and the second contact plate 909 from each other. In the push-in detection rod 907, at least the contact releasing portion 9072 is formed of an insulating material, and the electrical connection between the first contact plate 908 and the second contact plate 909 is disconnected in the state illustrated in FIG. 16D in which the contact releasing portion 9072 is interposed.

The first contact plate 908 and the second contact plate 909 are connected to respectively different metallic plates among the plurality of metallic plates 9111 to 9113 at an end opposite to the end that contacts the contact releasing portion 9072 of the push-in detection rod 907. Assume herein that the first contact plate 908 is connected to the metallic plate 9111 and the second contact plate 909 is connected to the metallic plate 9113. In this case, the presence or absence of a current is detected when a small voltage is applied to a node between the metallic plates 9111 and 9113, thereby enabling determination as to whether the toner bottle unit 900 is in the state before the piston push-in operation (unused state) or in the state after the piston push-in operation (used state). In other words, in a state where the toner bottle unit 900 is mounted on the supply container mounting portion 701, the controller 90 of the image forming apparatus 1 can determine whether the toner bottle unit 900 is unused or used based on whether the electrical connection between the metallic plates 9111 and 9113 is established. The controller 90 can also determine that the user has completed the supply operation based on the timing when the first contact plate 908 and the second contact plate 909 are electrically disconnected. Based on this determination, the controller 90 performs the display control for the panel 400 as described above. Further, the controller 90 writes a new cartridge flag (new: 1, used: 0), which indicates whether the toner bottle unit 900 is used, into the memory unit 911 depending on a change in the electrical connection between the metallic plates 9111 and 9113.

In the above-described configuration, the memory unit 911 may be desirably disposed on a circuit that connects the metallic plates 9111 and 9112. With this configuration, the controller 90 of the image forming apparatus 1 monitors the push-in operation of the toner bottle unit 900 through the metallic plates 9111 and 9113, and in parallel to this monitoring operation, the controller 90 can access the memory unit 911 through the metallic plates 9111 and 9112.

(2-4) Detection of Rotation of Toner Bottle Unit

Next, a method for detecting the rotation of the toner bottle unit 900 will be described with reference to FIGS. 16E and 16F. The rotation detection method according to the first exemplary embodiment is similar to the method according to the exemplary embodiment using the toner pack 40 described above, except that the shutter member 904 for sealing the discharge port of the supply container is mounted on the outer cylinder 903 of the shutter member 904.

As illustrated in FIGS. 16E and 16F, the supply container mounting portion 701 of the process cartridge is provided with two conductive plate springs 70151 and 70152 as the rotation detection portion 7015. The protruding portion 70135*b* is provided at an outer peripheral portion of the supply port shutter 7013.

As illustrated in FIG. 16E, before the toner bottle unit 900 inserted into the supply container mounting portion 701 is rotated, the leading end 701521 of the plate spring 70152 does not contact the plate spring 70152, and the rotation detection portion 7015 is in the disconnected state. In other words, no current flows even when a weak voltage is applied to a node between the plate springs 70151 and 70152. As illustrated in FIG. 16F, when the toner bottle unit 900 is rotated by 180 degrees, the plate spring 70152 is pressed by the protruding portion 70135*a* and contacts the other plate spring 70151 at the leading end 701521 to be electrically connected. In this state, a current flows when a weak voltage is applied to a node between the plate springs 70151 and 70152. The controller 90 of the image forming apparatus 1 recognizes whether the discharge port 9031 of the toner bottle unit 900 communicates with the supply port 8012 of the supply container mounting portion 701 based on whether the rotation detection portion 7015 is electrically connected or disconnected.

(2-5) Flow of Supply Operation Using Toner Bottle Unit

A series of operation for dismounting the toner bottle unit 900 after the toner bottle unit 900 is mounted on the supply container mounting portion 701 to supply toner will be described. Descriptions of processes similar to those of the above-described exemplary embodiment using the toner pack 40 are omitted.

First, the user mounts an unused toner bottle unit 900 on the supply container mounting portion 701. Specifically, the cutout shapes of the engagement surface 903s of the outer cylinder 903 and the engagement surface 904s of the shutter member 904 (see FIG. 15C) are aligned with the supply port 8012 and the lid portion 70131 (see FIG. 9A) of the supply port shutter 7013, and then the outer cylinder 903 and the shutter member 904 are inserted. Accordingly, the engagement surface 903s of the outer cylinder 903 engages with the engagement surface 7013s that is a side surface of the lid portion 70131 and the engagement surface 904s of the shutter member 904 engages with the engagement surface 8012s provided at an outer peripheral portion of the supply port 8012. At this time, the outer cylinder 903 that engages with the lid portion 70131 of the supply port shutter 7013 cannot be rotated until the lock state of the supply port shutter 7013 is released by the lock member 7014, and the outer cylinder 903 can be rotated together with the supply port shutter 7013 when the lock state of the supply port shutter 7013 is released. On the other hand, the shutter member 904 engages with the supply port 8012 that is fixed to the frame 8010 of the toner receiving unit 801, thereby disabling the rotation of the shutter member 904. The plate springs 70151 and 70152 of the rotation detection portion 7015 are separated from each other, and thus the rotation detection portion 7015 is in the disconnected state (see FIG. 16E).

When the toner bottle unit 900 in the unused state is inserted into the supply container mounting portion 701, the controller 90 recognizes that the toner bottle unit 900 is new based on the new cartridge detection configuration described above. As described above, the controller 90 may recognize the electrical connection between the metallic plates 9111 to 9113, or may read the new cartridge flag (new: 1, used: 0) for determination as described above. Then, the controller 90 operates the pressing mechanism 600 to move the lock member 7014 to the unlock position, thereby bringing the toner bottle unit 900 into a rotatable state.

After that, when the user grips and rotates the toner bottle unit 900 by 180 degrees, the shutter member 904 and the supply port shutter 7013 are opened and the discharge port 9031 of the toner bottle unit 900 communicates with the supply port 8012 of the supply container mounting portion 701. The operation in which the shutter member 904 and the supply port shutter 7013 are opened along with the rotation of the toner bottle unit 900 is similar to that described above in the example of the toner pack 40 with reference to FIGS. 10A, 10B, and 10C.

As illustrated in FIG. 16F, in a state where the toner bottle unit 900 is rotated by 180 degrees, the leading end 701521 of the plate spring 70152 that is pressed by the protruding portion 70135a of the supply port shutter 7013 contacts the other plate spring 70151. Thus, when the rotation detection portion 7015 is in the electrically connected state, the controller 90 of the image forming apparatus 1 detects that the rotation operation for the toner bottle unit 900 is carried out. Specifically, the controller 90 recognizes that the sealed state of the shutter member 904 and the supply port shutter 7013 is released and the discharge port 9031 of the toner bottle unit 900 communicates with the supply port 8012 of the supply container mounting portion 701. Further, the controller 90 operates the pressing mechanism 600 to move the lock member 7014 to the lock position, thereby regulating the rotation of the toner bottle unit 900.

Next, the user presses the piston 902 of the toner bottle unit 900 and starts a toner discharge operation. Toner that has fallen into the toner containing portion 8011 is conveyed within the toner receiving unit 801 and reaches the developer container 32. Also, in the present modified example, when the piston 902 is pushed into the innermost side, the above-described push-in detection mechanism detects that the push-in operation of the piston 902 is completed. Specifically, as illustrated in FIG. 16B, when the push-in rib 9021 of the piston 902 presses the piston contact portion 9071 of the push-in detection rod 907, thereby moving the push-in detection rod 907 in an interlocking manner with the piston 902. As illustrated in FIG. 16D, the contact releasing portion 9072 of the push-in detection rod 907 disconnects the electrical connection between the first contact plate 908 and the second contact plate 909. The controller 90 of the image forming apparatus 1 recognizes that the push-in operation of the piston 902 is completed based on a fact that no current flows when a voltage is applied to a node between the metallic plate 9111 connected to the first contact plate 908 and the metallic plate 9113 connected to the second contact plate 909. In other words, in the case of the present modified example, the detection of the completion of the push-in operation of the piston 902 by the push-in detection mechanism is a condition for determining the completion of the toner discharge operation. As another configuration example, when the electrical connection between the first contact plate 908 and the second contact plate 909 is disconnected, the controller 90 may overwrite the new cartridge flag in the memory unit 911 and may determine that the toner discharge operation is completed when the new cartridge flag is overwritten.

The controller 90 which has detected the completion of discharge of toner from the toner bottle unit 900 operates the pressing mechanism 600 again to cause the lock member 7014 to move to the unlock position and bring the toner bottle unit 900 into the rotatable state. The user grips and rotates the toner bottle unit 900 by 180 degrees. Then, the discharge port 9031 of the toner bottle unit 900 is covered with the shutter member 904, and the supply port 8012 of the supply container mounting portion 701 is covered with the lid portion 70131 of the supply port shutter 7013. As illustrated in FIG. 16E, the plate springs 70151 and 70152 are separated from each other and the rotation detection portion 7015 enters the disconnected state again. Then, the controller 90 recognizes that the supply port shutter 7013 is in the closed state and operates the pressing mechanism 600 to move the lock member 7014 to the lock position. Thus, the supply container mounting portion 701 is restored to the initial state before the toner supply operation is performed.

(3) Second Modified Example

Next, a second modified example in which the configuration of the process cartridge is different from that described above will be described. Components other than the components related to the process cartridge in the second modified example have the same configurations as those of the first exemplary embodiment, and thus descriptions of the same configurations are omitted.

(3-1) Process Cartridge

Figure 17A:
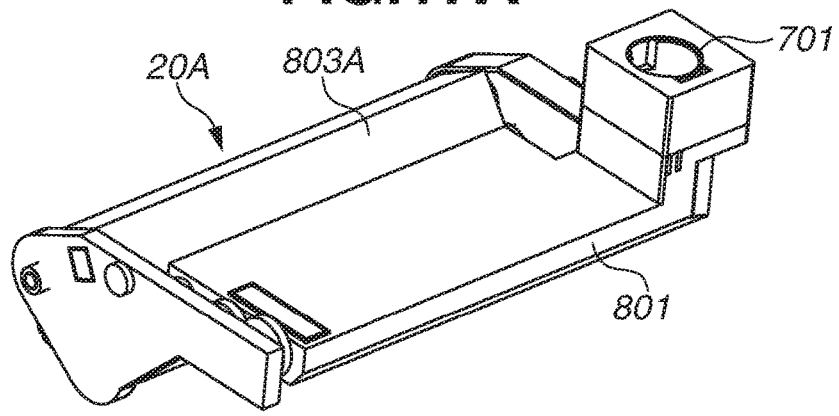
FIG. 17A is a perspective view of a process cartridge according to a second modified example.
Figure 17B:
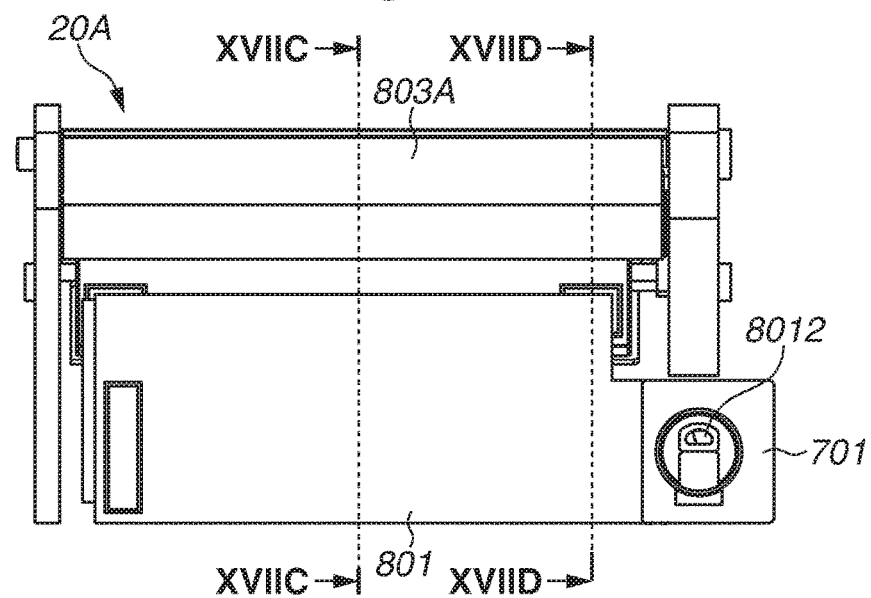
FIG. 17B is a top view of the process cartridge according to the second modified example.
Figure 17C:
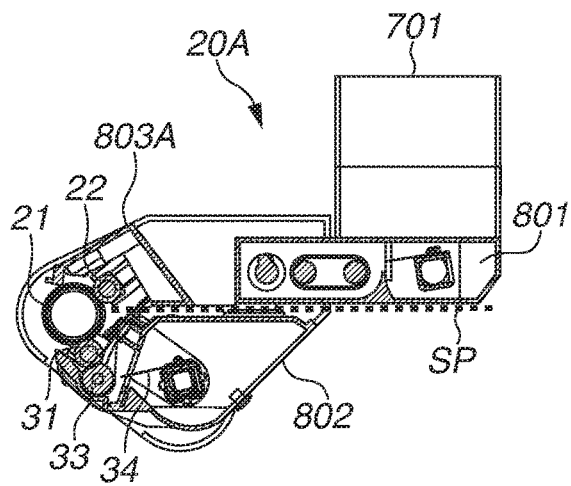
FIG. 17C is a sectional view of the process cartridge taken along a line XVIIC-XVIIC in FIG. 17B.
Figure 17D:
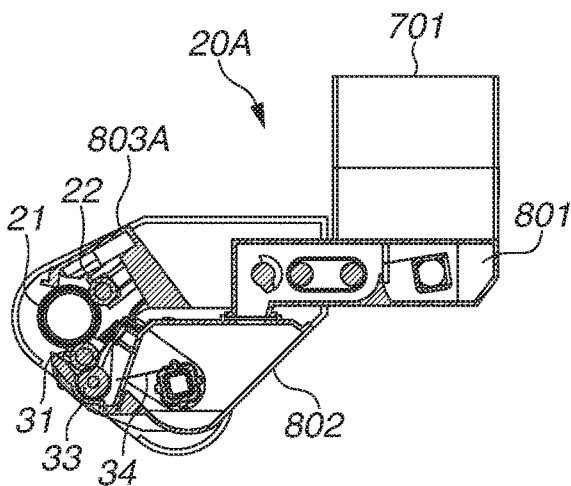
FIG. 17D is a sectional view of the process cartridge taken along a line XVIID-XVIID in FIG. 17B.

FIG. 17A is a perspective view of a process cartridge 20A according to the second modified example. FIG. 17B is a top view of the process cartridge 20A according to the second modified example. FIG. 17C is a sectional view of the process cartridge 20A taken along a line XVIIC-XVIIC in FIG. 17B. FIG. 17D is a sectional view of the process cartridge 20A taken along a line XVIID-XVIID in FIG. 17B.

As illustrated in FIGS. 17A, 17B, 17C, and 17D, the process cartridge 20A according to the second modified example includes the toner receiving unit 801, the development unit 802, and a drum unit 803A. Unlike the first exemplary embodiment, the cleaning blade 24 that clears the surface of the photosensitive drum 21 and the waste toner chamber 8033 (see FIG. 6A) that contains waste toner are not included in the drum unit 803A. This is because the second modified example employs a cleanerless configuration in which transfer residual toner that has not been transferred onto a recording material and is left on the surface of the photosensitive drum 21 is collected in the development unit 802 and the collected toner is reused. Also, in this modified example, assume that, for example, non-magnetic or magnetic one-component developer is used.

In the example illustrated in the drawings, the development unit 802 is located in the lower portion of the process cartridge 20A, and the toner receiving unit 801 and the drum unit 803A are located above the development unit 802 in the direction of gravitational force. As illustrated in FIG. 17B, the positions of the toner receiving unit 801 and the drum unit 803A may be at least partially aligned in the vertical direction without overlapping each other as viewed from the direction of gravitational force. Further, the toner receiving unit 801 is disposed in the space in which the cleaning blade 24 and the waste toner chamber 8033 are provided according to the first exemplary embodiment. Although the configuration of the supply container mounting portion 701 provided in the toner receiving unit 801 is the same as that in the first exemplary embodiment, a simplified shape of the supply container mounting portion 701 is illustrated in FIGS. 17A to 17D.

The laser passage space SP is formed between the development unit 802 and each of the drum unit 803A and the toner receiving unit 801 as a void through which the laser beam L emitted from the scanner unit 11 (see FIG. 1A) to the photosensitive drum 21 can pass. The drum unit 803A may be desirably provided with a pre-exposure apparatus for deleting the electrostatic latent image by irradiating the surface of the photosensitive drum 21 with light at the downstream side of the transfer portion and between the drum unit 803A and the charging roller 22 in the rotational direction of the photosensitive drum 21.

(3-2) Behavior of Toner in Cleanerless Configuration

The behavior of toner in the cleanerless configuration will be described. Transfer residual toner that has not been transferred and is left on the surface of the photosensitive drum 21 in the transfer portion is removed by the following process. The transfer residual toner includes a mixture of toner that is charged to a positive polarity and toner that is charged to a negative polarity but does not have sufficient electric charges. The surface of the photosensitive drum 21 onto which toner has been transferred is discharged by the pre-exposure apparatus, and uniformly discharged by the charging roller 22, so that the transfer residual toner is charged to the negative polarity again. The transfer residual toner charged to the negative polarity again by the charging portion reaches the development portion along with the rotation of the photosensitive drum 21. Then, the surface area of the photosensitive drum 21 which has passed through the charging portion is exposed to light by the scanner unit 11 and an electrostatic latent image is written onto the surface area in a state where the transfer residual toner adheres to the surface.

The behavior of the transfer residual toner which has reached the development portion in an exposure portion and a non-exposure portion of the photosensitive drum 21 will be described separately. The transfer residual toner that adheres to the non-exposure portion of the photosensitive drum 21 is transferred to the development roller 31 due to a potential difference between the potential (dark area potential) of the non-exposure portion of the photosensitive drum 21 and the development voltage in the development portion, and the transferred toner is collected in the developer container 32. This is because the development voltage to be applied to the development roller 31 has a positive polarity relative to the potential of the non-exposure portion, assuming that toner has a negative polarity as a regular charging polarity. The toner collected in the developer container 32 is agitated by the agitation member 34 with the toner contained in the developer container and is dispersed. Then, the toner is carried to the development roller 31 and is reused for the development process.

On the other hand, the transfer residual toner adhering to the exposure portion of the photosensitive drum 21 is not transferred onto the development roller 31 from the photosensitive drum 21 in the development portion and is left on the surface of the photosensitive drum 21. This is because the development voltage to be applied to the development roller 31 has a more negative potential than the potential (bright area potential) of the exposure portion, assuming that toner has a negative polarity as a regular charging polarity. The transfer residual toner, which is left on the surface of the photosensitive drum 21, as well as other toner to be transferred from the development roller 31 to the exposure portion, is carried to the photosensitive drum 21 and moved to the transfer portion, and is then transferred onto the recording material at the transfer portion.

The use of the cleanerless configuration eliminates the need for a space for installing a collector for collecting transfer residual toner, which leads to a further reduction in the size of the image forming apparatus 1. Furthermore, the reuse of transfer residual toner makes it possible to reduce printing costs.

(4) Third Modified Example

Next, a third modified example in which the configuration of the process cartridge is different from that of any one of the above-described configurations. Components other than the components related to the process cartridge in the third modified example have the same configurations as those of the first exemplary embodiment, and thus descriptions of the same configurations are omitted.

(4-1) Third Mode of Process Cartridge

Figure 18A:
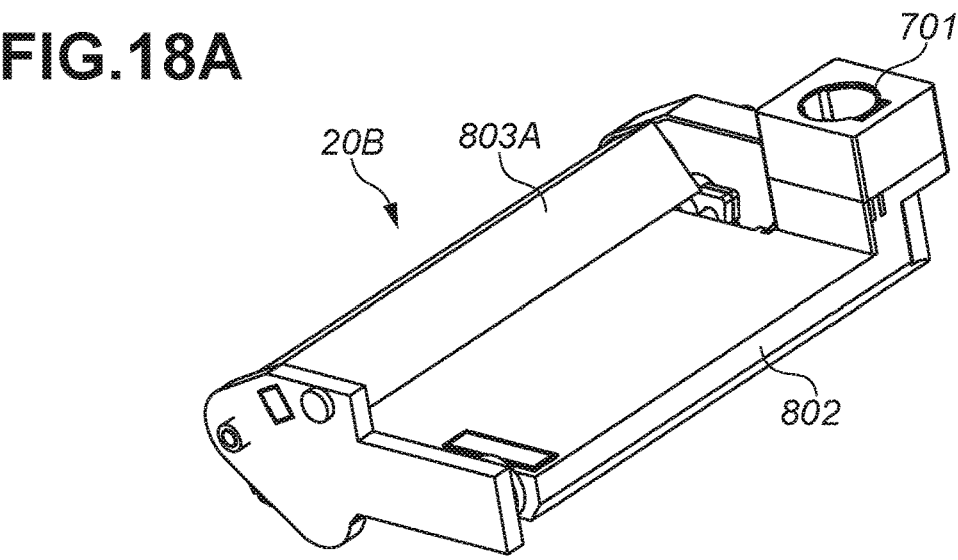
FIG. 18A is a perspective view of a process cartridge according to a third modified example.
Figure 18B:
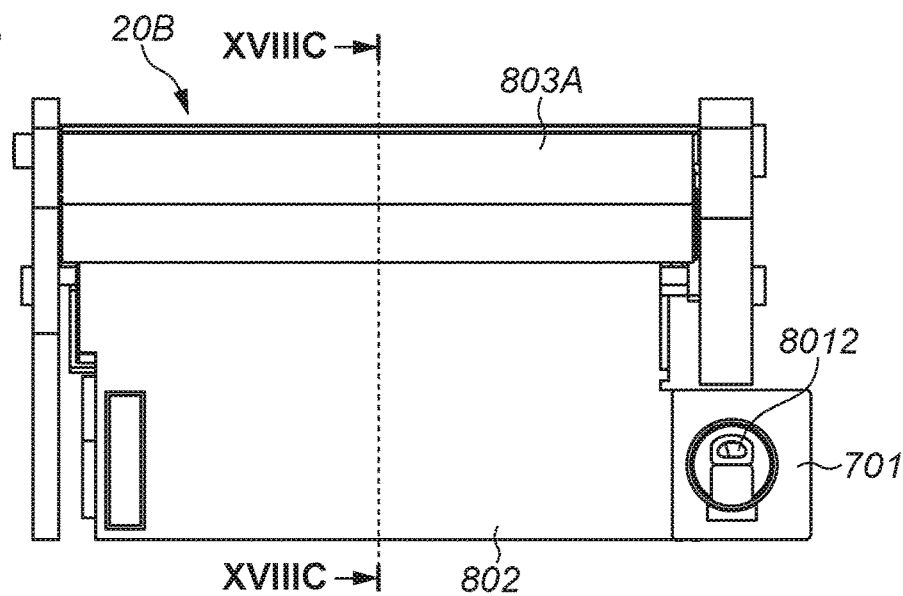
FIG. 18B is a top view of the process cartridge according to the third modified example.
Figure 18C:
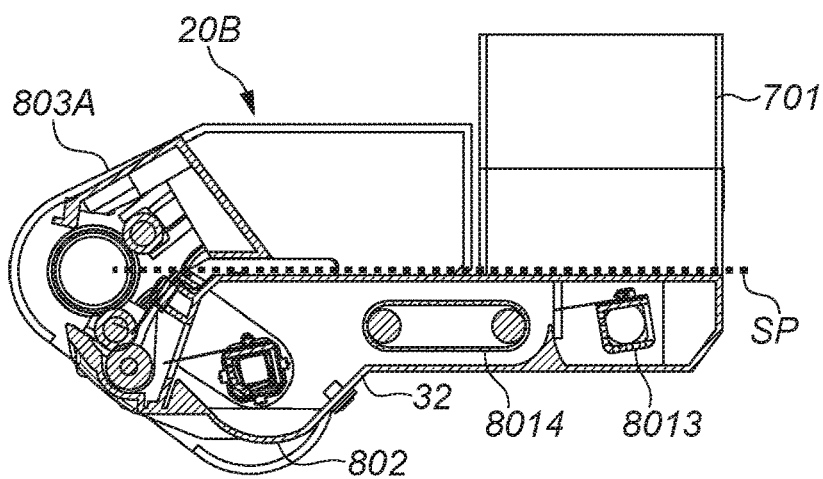
FIG. 18C is a sectional view of the process cartridge taken along a line XVIIIC-XVIIIC in FIG. 18B.

FIG. 18A is a perspective view of a process cartridge 20B according to the third modified example. FIG. 18B is a top view of the process cartridge 20B according to the third modified example. FIG. 18C is a sectional view of the process cartridge 20B taken along a line XVIIIC-XVIIIC in FIG. 18B.

As illustrated in FIGS. 18A, 18B, and 18C, the process cartridge 20B according to the third modified example includes the development unit 802 and the drum unit 803A. Unlike the first exemplary embodiment, the toner receiving unit 801 is omitted and the supply container mounting portion 701, the first conveyance member 8013, and the second conveyance member 8014 are disposed in the development unit 802. In other words, the present modified example has a configuration in which the toner supply operation is performed by mounting the supply container, such as the toner pack 40 or the toner bottle unit 900, on the supply port 812, which is provided at the developer container 32, from the outside of the image forming apparatus 1. Although the configuration of the supply container mounting portion 701 is the same as that of the first exemplary embodiment, a simplified shape of the supply container mounting portion 701 is illustrated in FIGS. 18A, 18B, and 18C.

The laser passage space SP is formed between the development unit 802 and the drum unit 803A as a void through which the laser beam L emitted from the scanner unit 11 (see FIG. 1A) to the photosensitive drum 21 can pass. The drum unit 803A may be desirably provided with a pre-exposure apparatus for deleting the electrostatic latent image by irradiating the surface of the photosensitive drum 21 with light on the downstream side of the transfer portion and between the drum unit 803A and the charging roller 22 in the rotational direction of the photosensitive drum 21. The third modified example employs the cleanerless configuration. The behavior of toner in the cleanerless configuration is the same as that in the second modified example, and thus the description thereof is omitted.

(5) Control System for Image Forming Apparatus

Figure 19:
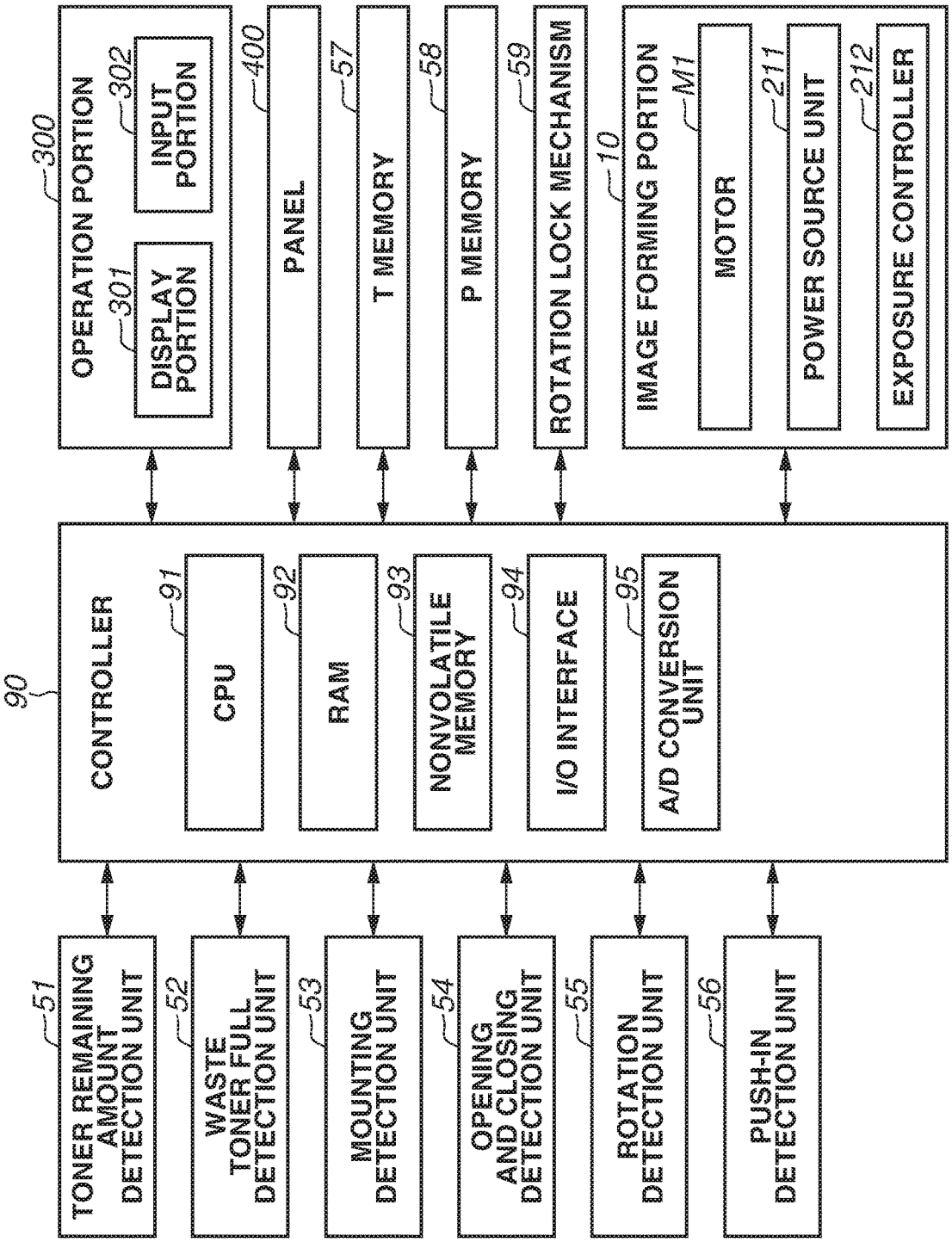
FIG. 19 is a block diagram illustrating a control system for the image forming apparatus according to the first exemplary embodiment.

FIG. 19 is a block diagram illustrating a control system for the image forming apparatus 1 according to the first exemplary embodiment. The controller 90 serving as a control unit of the image forming apparatus 1 includes a central processing unit (CPU) 91 as an arithmetic unit, a random access memory (RAM) 92 used as a work area for the CPU 91, and a nonvolatile memory 93 that stores various programs. The controller 90 includes an input/output (I/O) interface 94 as an input/output port to be connected to an external apparatus, and an analog-to-digital (A/D) conversion unit 95 that converts an analog signal into a digital signal. The CPU 91 reads and executes control programs stored in the nonvolatile memory 93, thereby controlling each unit of the image forming apparatus 1. Accordingly, the nonvolatile memory 93 is an example of a non-transitory storage medium that stores control programs for operating the image forming apparatus 1 according to a specific method.

Further, the controller 90 is connected to each of a T memory 57 and a P memory 58. The T memory 57 is a nonvolatile memory mounted on the supply container, such as the toner pack 40 or the toner bottle unit 900. The P memory 58 is a nonvolatile memory mounted on the process cartridge 20. Examples of the T memory 57 serving as the storage unit provided in the supply container include the memory unit 45 mounted on the toner pack 40 described above and the memory unit 911 mounted on the toner bottle unit 900 described above. The T memory 57 also stores toner information indicating that toner contained in the supply container, such as the toner pack 40 or the toner bottle unit 900, can be supplied to the developer container 32. The term "toner information" refers to information indicating, for example, whether the toner pack 40 is in the unused state, the initial capacity of toner, an expiration date, and the like. The P memory 58 also stores, for example, information about the remaining amount of toner contained in the developer container 32, the total amount of toner previously supplied, the lifetime of the photosensitive member, and a timing of replacement of the process cartridge 20.

The controller 90 is also connected to each of a rotation lock mechanism 59 and the image forming portion 10. Examples of the rotation lock mechanism 59 include the lock member 7014 (see FIGS. 9B, 11A, and 11B) provided on the supply container mounting portion 701 and the pressing mechanism 600 (see FIG. 13) for moving the lock member 7014. The image forming portion 10 includes a motor M1 serving as a drive source for driving the photosensitive drum 21, the development roller 31, the supply roller 33, the agitation member 34, and the like. These rotary members need not necessarily use the same drive source, but instead, for example, the photosensitive drum 21, the development roller 31, the supply roller 33, and the agitation member 34 may be driven by respectively different motors. The image forming portion 10 also includes a power source unit 211 for applying a voltage to the members including the development roller 31, and an exposure controller 212 for controlling the scanner unit 11.

An input side of the controller 90 is connected to each of a toner remaining amount detection unit 51, a waste toner full detection unit 52, a mounting detection unit 53, an opening and closing detection unit 54, a rotation detection unit 55, and a push-in detection unit 56.

The toner remaining amount detection unit 51 detects the remaining amount of toner contained in the developer container 32. The optical sensor (51a and 51b) illustrated in FIG. 6A is an examples of the toner remaining amount detection unit 51. The optical sensor includes a light-emitting portion 51a that emits detection light to the inside of the developer container 32, and a light-receiving portion 51b that detects the detection light. In this case, a ratio (duty) of a period in which an optical path of detection light is blocked by toner to a rotation cycle during rotation of the agitation member 34 has a correlation with the toner remaining amount in the developer container 32. By using this correlation, the correspondence between the duty value and the toner remaining amount is prepared in advance, thereby obtaining the toner remaining amount based on the current duty value. The optical sensor (51a and 51b) as described above is an example of the toner remaining amount detection unit. Instead of the optical sensor, a pressure sensitive sensor and a capacitive sensor may also be used. The waste toner full detection unit 52 detects that the amount of waste toner stored in the waste toner chamber 8033 (see FIG. 6A) of the cleaning unit 803 has reached a predetermined upper limit. As the waste toner full detection unit 52, for example, a pressure sensitive sensor disposed in the waste toner chamber 8033 can be used. Based on an estimation that a predetermined ratio of image information is collected as waste toner, the controller 90 may calculate and estimate the amount of waste toner based on the image information.

The mounting detection unit 53 detects that the supply container, such as the toner pack 40, is mounted on the supply container mounting portion 701. The mounting detection unit 53 is provided on, for example, the supply container mounting portion 701 and includes a pressure sensitive switch that is pressed by the bottom surface of the toner pack 40 and outputs a detection signal. The mounting detection unit 53 may be a detection circuit that detects that the T memory 57 is electrically connected to the controller 90 through the contact portions 70133 (see FIG. 9B) of the supply container mounting portion 701.

The rotation detection unit 55 detects the rotation of the supply container mounted on the supply container mounting portion 701. An example of the rotation detection unit 55 is the rotation detection portion 7015 that is composed of the plate springs 70151 and 70152 (see FIGS. 9A, 9B, 16E, and 16F). The rotation detection portion 7015 is an example of the rotation detection unit 55. For example, a photoelectric sensor that is shielded by a protruding portion provided on the supply port shutter 7013 may be used as the rotation detection sensor. As another example of the rotation detection sensor, a configuration in which the plate springs 70151 and 70152 of the rotation detection portion 7015 are electrically connected by the protruding portion provided on the discharge portion 42 of the toner pack 40 may be used.

The push-in detection unit 56 is an element to be added when the toner bottle unit 900 according to the first modified example is used, and detects the completion of the push-in operation of the piston 902 of the toner bottle unit 900. An example of the push-in detection unit 56 is a detection circuit that is provided in the image forming apparatus 1 and detects a variation in the state of the push-in detection mechanism (see FIGS. 16C and 16D) which includes the push-in detection rod 907, the first contact plate 908, and the second contact plate 909, which are provided in the toner bottle unit 900. This detection circuit monitors a current value when the first contact plate 908 and the second contact plate 909 apply voltages to the metallic plates 9111 and 9113, which are connected to the first contact plate 908 and the second contact plate 909, respectively, thereby detecting whether the push-in operation of the piston 902 is not performed yet or is already performed.

The controller 90 is also connected to the operation portion 300 serving as a user interface of the image forming apparatus 1, and to the panel 400 serving as a notification unit (informing unit) for notifying the user of information about the toner remaining amount in the developer container 32. The information about the toner remaining amount used herein is not limited to information indicating only the toner remaining amount. The information about the toner remaining amount also includes information indicating the amount of toner that has already been supplied using the toner pack 40 or the toner bottle unit 900. The information about the toner remaining amount also includes information indicating an available storage capacity of the developer container 32 to indicate how many toner packs 40 or toner bottle units 900 can be supplied to the developer container 32.

The operation portion 300 includes a display portion 301 capable of displaying various setting screens. The display portion 301 is composed of, for example, a liquid crystal panel. The operation portion 300 includes an input portion 302 that receives an input operation from the user. The input portion 302 is composed of, for example, a physical button or a touch panel functioning portion of a liquid crystal panel. Further, the controller 90 is connected to an external apparatus, such as a desk top computer or a smartphone, via the 110 interface 94.

Second Exemplary Embodiment

An image forming apparatus and an image forming system according to a second exemplary embodiment of the present disclosure will be described with reference to the drawings. The second exemplary embodiment differs from the first exemplary embodiment in that user authentication is performed by NFC communication, at least one of the main body and the reader can be driven, and a motor 613 for driving first conveyance member 8013, the second conveyance member 8014, and the third conveyance member 8015 and an NFC unit 140 are arranged in predetermined positions.

Similar to the first exemplary embodiment, the configuration in which the NFC unit 140 for performing NFC communication is installed in the image forming apparatus 1 illustrated in FIG. 4A will be described with reference to FIGS. 24, 25, 26, and 27.

Figure 24:
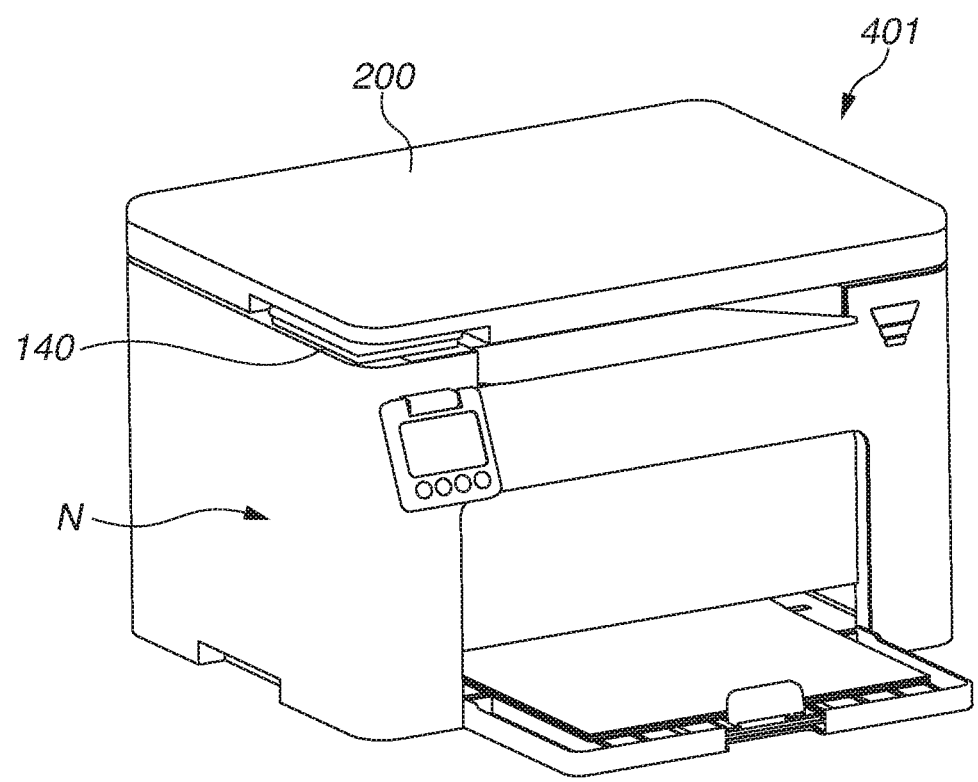
FIG. 24 is a perspective view of an image forming apparatus in which an NFC unit is disposed according to a second exemplary embodiment.
Figure 25:
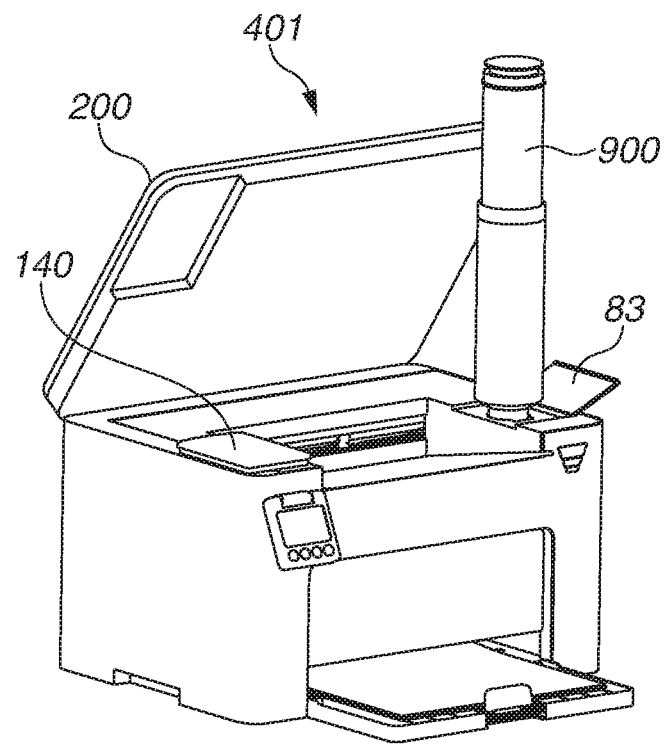
FIG. 25 is a perspective view illustrating a state where a toner bottle unit is mounted in the toner supply port of the image forming apparatus illustrated in FIG. 24 according to the second exemplary embodiment.
Figure 26:
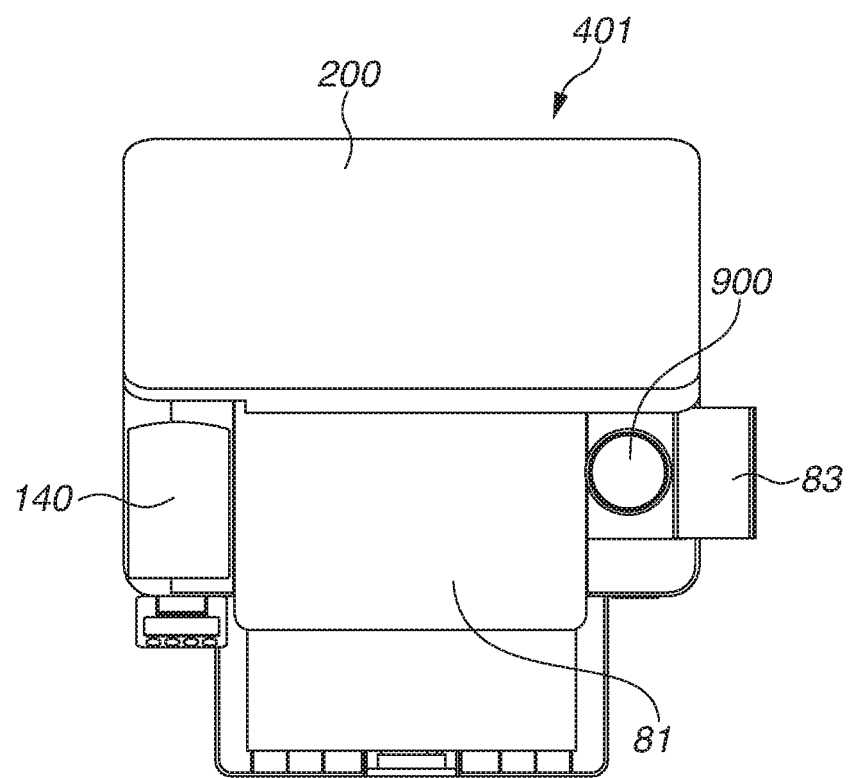
FIG. 26 is a top view illustrating a state where the toner bottle unit is mounted in the toner supply port of the image forming apparatus illustrated in FIG. 24 according to the second exemplary embodiment.
Figure 27:
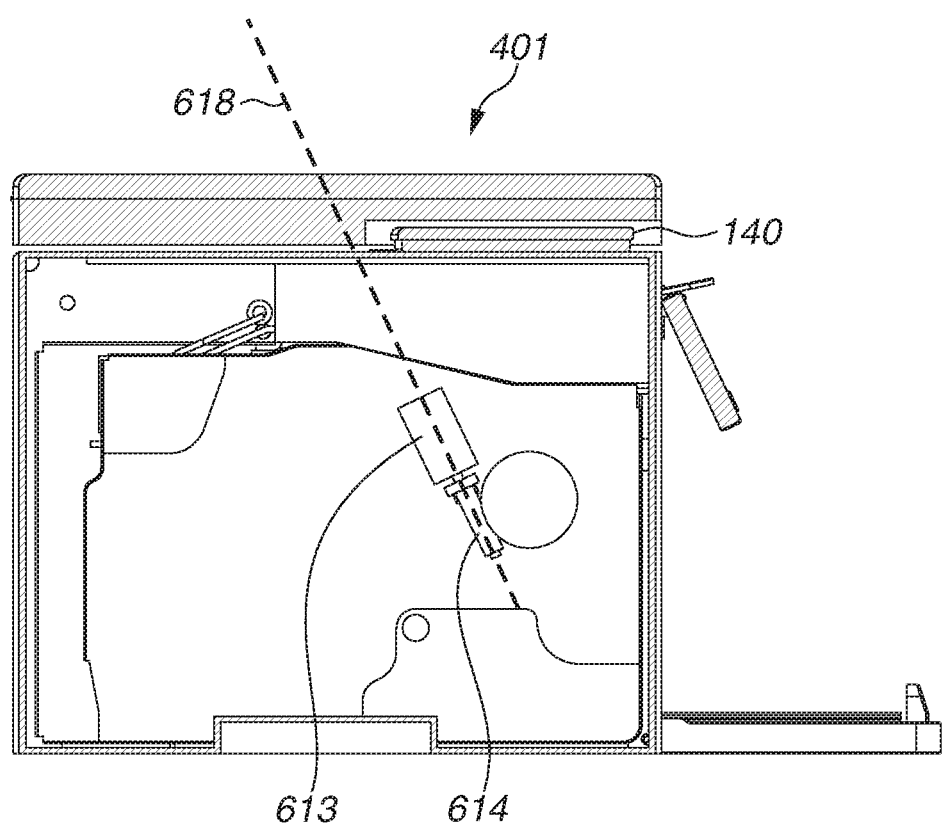
FIG. 27 is a view illustrating the image forming apparatus according to the second exemplary embodiment, in which the illustration of the outer package is omitted, as viewed from a direction indicated by an arrow N illustrated in FIG. 24.

FIG. 24 is a perspective view of an image forming apparatus 401 when the NFC unit 140 is installed according to the second exemplary embodiment. FIG. 25 is a perspective view of a state where the toner bottle unit 900 is mounted on the image forming apparatus 401 including the NFC unit 140 illustrated in FIG. 24. FIG. 26 is a top view of the image forming apparatus 401, illustrated in FIG. 25, on which the toner bottle unit 900 is mounted. FIG. 27 is a view of an image forming apparatus 401 according to the second exemplary embodiment, in which the illustration of the outer package is omitted, as viewed from a direction indicated by an arrow N illustrated in FIG. 24.

The NFC unit 140 includes an antenna and is disposed on the left side as viewed from the front side of the main body (see FIG. 24). In the present exemplary embodiment, the NFC unit 140 is mounted on the outside of the main body, but instead may be disposed in a cover made of a material that transmits electromagnetic waves.

Similar to the first exemplary embodiment, in second exemplary embodiment, in order to supply toner, the user opens the reader 200, mounts the toner bottle unit 900 on the supply port (see FIG. 25), and holds the NFC card (not illustrated), which serves as an authentication unit for performing authentication, over the NFC unit 140. Thus, the image forming apparatus 401 performs user authentication using the NFC card held over the NFC unit 140, thereby making it possible to drive at least one of the main body and the reader.

The NFC unit 140 is not disposed on the reader 200, but is disposed outside on the upper surface of the main body excluding the area of the discharge tray 81, and is disposed in an area other than the area between the rotation axis and the toner supply port in the direction orthogonal to the rotation axis of the reader (see FIG. 26).

Similar to the first exemplary embodiment, the image forming apparatus 401 according to the second exemplary embodiment includes an input gear 614 for driving the first conveyance member 8013, the second conveyance member 8014, and the third conveyance member 8015, which convey toner, and the motor 613 for driving the input gear 614. In the present exemplary embodiment, the NFC unit 140 is installed at a position away from an axial line 618 of the motor 613 (see FIG. 27). With this layout, the NFC unit 140 is disposed at a location where the NFC unit 140 is less likely to be affected by the magnetic line of force of the motor 613. Also, in the second exemplary embodiment, the NFC unit 140 is installed at a position away from the axial line 618 of the motor 613.

With the above-described configuration, the following advantageous effects can be obtained.

(1) Similar to the first exemplary embodiment, the NFC unit 140 is disposed on the upper surface of the main body, thereby enabling the NFC card to easily contact the NFC unit 140 in a state where the toner bottle unit 900 is mounted. Consequently, the operability in the authentication operation during the toner supply operation can be improved.

(2) Similar to the first exemplary embodiment, the NFC unit 140 and the toner supply port are disposed such that the NFC unit 140 and the toner supply port overlap the reader in any one of a plurality of attitudes (at least the closed state) as viewed from above the main body, thereby preventing an increase in the size of the main body.

(3) The NFC unit 140 is disposed on the opposite side of the toner bottle unit 900 with the discharge tray 81 therebetween as viewed from the front side of the main body, thereby preventing the NFC unit 140 from being hidden behind the toner bottle unit 900. This configuration allows the user to easily recognize the NFC unit 140 and also facilitates contact of the NFC card.

(4) The NFC unit 140 and the toner supply port are disposed on the opposite sides of each other with the discharge tray 81 interposed therebetween, thereby enabling the arrangement with high space efficiency, regardless of the position of the toner supply port during arrangement of the NFC unit 140.

(5) As illustrated in FIG. 24, the NFC unit 140 is located at a position away from the axial line 618 of the motor 613. Thus, when the user causes the NFC unit to read signals from the NFC card, the adverse effect of the magnetic line of force of the motor 613 can be reduced and the signals can be more reliably received (communicated). In addition, noise in the received signals caused due to the effect of the magnetic force can be reduced and the occurrence of malfunction can be prevented. In particular, the motor 613 drives a conveyance unit with a large load and thus needs a larger output, thereby generating large magnetic force. Accordingly, the adverse effect of the large magnetic force can be reduced by disposing the NFC unit 140 at a location away from the axial line. Consequently, the NFC unit 140 and the NFC card can stably communicate with each other.

As escribed above, by arranging the NFC unit 140 at a predetermined position in the image forming apparatus 401, the five advantageous effects as described above can be achieved.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-194553, filed Oct. 25, 2019, which is hereby incorporated by reference herein in its entirety.

What is claimed is:

1. An image forming apparatus to which a supply container is detachably mounted, the image forming apparatus comprising:
    a main body including a photosensitive member on which an electrostatic latent image is formed, a development unit having a toner containing portion containing toner and configured to develop the electrostatic latent image with the toner to form a toner image on the photosensitive member, a discharge tray provided at an upper surface of the main body, and a discharge portion configured to discharge a recording material on which the toner image is formed onto the discharge tray;
    a toner supply port to which the supply container is mounted and through which the toner is supplied to the toner containing portion of the development unit from the supply container; and
    a non-contact communication portion including an antenna and configured to receive a signal for user authentication,
    wherein the toner supply port and the non-contact communication portion are provided at the upper surface the main body, and
    wherein the non-contact communication portion is provided at an area of the upper surface outside the discharge tray.

2. The image forming apparatus according to claim 1, further comprising a reader provided above the upper surface of the main body, the reader being configured to pivot about a pivot axis between an open position and a closed position,
    wherein the non-contact communication portion is disposed in an area of the upper surface other than an area of the upper surface between the pivot axis of the reader and the toner supply port in a direction orthogonal to the pivot axis.

3. The image forming apparatus according to claim 2, wherein the non-contact communication portion is provided in an overlapping manner with the reader in a state that the reader is in the closed position when the image forming apparatus is viewed from above.

4. The image forming apparatus according to claim 2, wherein the toner supply port is provided in an overlapping manner with the reader in a state that the reader is in the closed position when the image forming apparatus is viewed from above.

5. The image forming apparatus according to claim 2, wherein the non-contact communication portion performs the user authentication to enable at least one of the main body and the reader to be driven.

6. The image forming apparatus according to claim 1, wherein the non-contact communication portion is disposed at a position away from an axial line of a motor provided in the image forming apparatus.

7. The image forming apparatus according to claim 6, wherein the non-contact communication portion and the motor are disposed on one side with respect to the discharge tray.

8. The image forming apparatus according to claim 6, wherein the motor drives a conveyance unit configured to convey toner supplied from the supply container.

9. The image forming apparatus according to claim 1, further comprising a toner supply control mechanism configured to control whether supply of toner to be supplied from the supply container mounted on the toner supply port is executable,
    wherein the toner supply control mechanism is controlled by the signal received by the non-contact communication portion.

10. The image forming apparatus according to claim 9, wherein the non-contact communication portion is disposed at a position away from an axial line of a motor for controlling the toner supply control mechanism.

11. The image forming apparatus according to claim 1, wherein the toner supply port and the non-contact communication portion are arranged in a discharge direction in which the discharge portion discharges the recording material onto the discharge tray.

12. The image forming apparatus according to claim 11, wherein the non-contact communication portion is provided downstream of the toner supply port in the discharge direction.

13. The image forming apparatus according to claim 1, wherein the toner supply port is provided at an opposite side of the non-contact communication portion across the discharge tray in a direction orthogonal to a discharge direction in which the discharge portion discharges the recording material onto the discharge tray.

14. The image forming apparatus according to claim 1, wherein the toner supply port is provided at the area of the upper surface outside the discharge tray.

* * * * *